US 7,912,096 B2

(12) United States Patent
Tsukamoto

(10) Patent No.: US 7,912,096 B2
(45) Date of Patent: Mar. 22, 2011

(54) ADD/DROP MULTIPLEXER AND INTERFACE

(75) Inventor: Keiichiro Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2486 days.

(21) Appl. No.: 10/100,290

(22) Filed: Mar. 18, 2002

(65) Prior Publication Data

US 2003/0112832 A1 Jun. 19, 2003

(30) Foreign Application Priority Data

Dec. 17, 2001 (JP) ................................. 2001-383531

(51) Int. Cl.
*H04J 3/04* (2006.01)
(52) U.S. Cl. .................... 370/535; 370/538; 370/539
(58) Field of Classification Search .................. 370/535, 370/538, 539
See application file for complete search history.

(56) References Cited

U.S. PATENT DOCUMENTS

| 5,189,410 | A | * | 2/1993 | Kosugi et al. | 340/825.2 |
|---|---|---|---|---|---|
| 6,044,088 | A | * | 3/2000 | Rahman et al. | 370/465 |
| 6,608,844 | B1 | * | 8/2003 | Teodorescu et al. | 370/512 |
| 2002/0065073 | A1 | * | 5/2002 | Natani et al. | 455/422 |
| 2002/0067746 | A1 | * | 6/2002 | Kitagawa | 370/539 |
| 2002/0159457 | A1 | * | 10/2002 | Zhang et al. | 370/391 |

FOREIGN PATENT DOCUMENTS

JP 11-122320 4/1999

* cited by examiner

*Primary Examiner* — Jason E Mattis
(74) *Attorney, Agent, or Firm* — Katten Muchin Rosenman LLP

(57) ABSTRACT

An add/drop multiplexer where a first signal converter converts first-low-order-group signals received from DSn network, into high-order-group signals, which are transferred to SDH (SONET) network and to which second-low-order-group signals, slower in transmission speed than the first-low-order-group signals are added. A second signal converter converts high-order-group signals, received from SDH (SONET) network, into first-low-order-group signals. A selector selectively outputs first-low-order-group signals received from the DSn network, or first-low-order-group signals obtained by the second signal converter, as the input signals to the first signal converter.

8 Claims, 19 Drawing Sheets

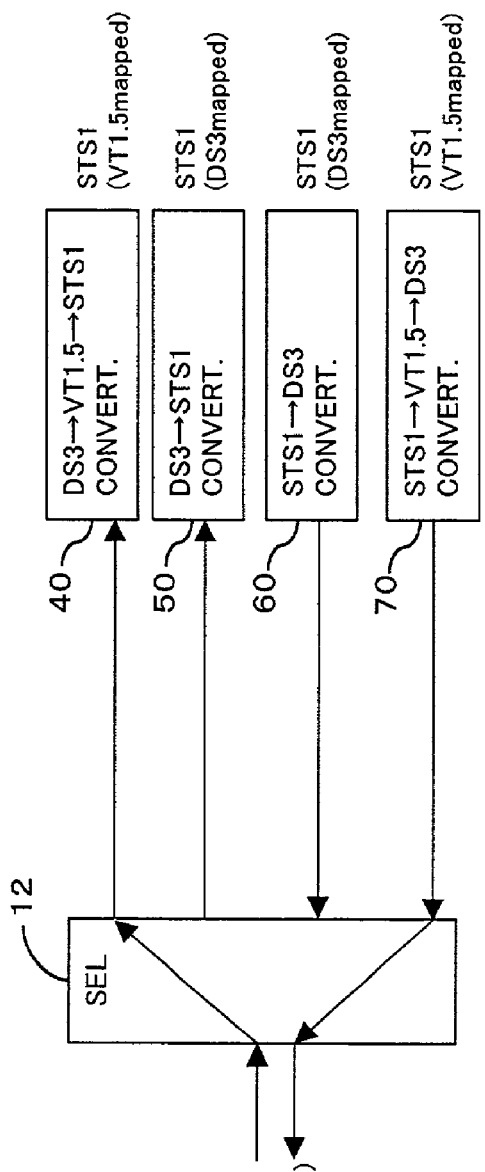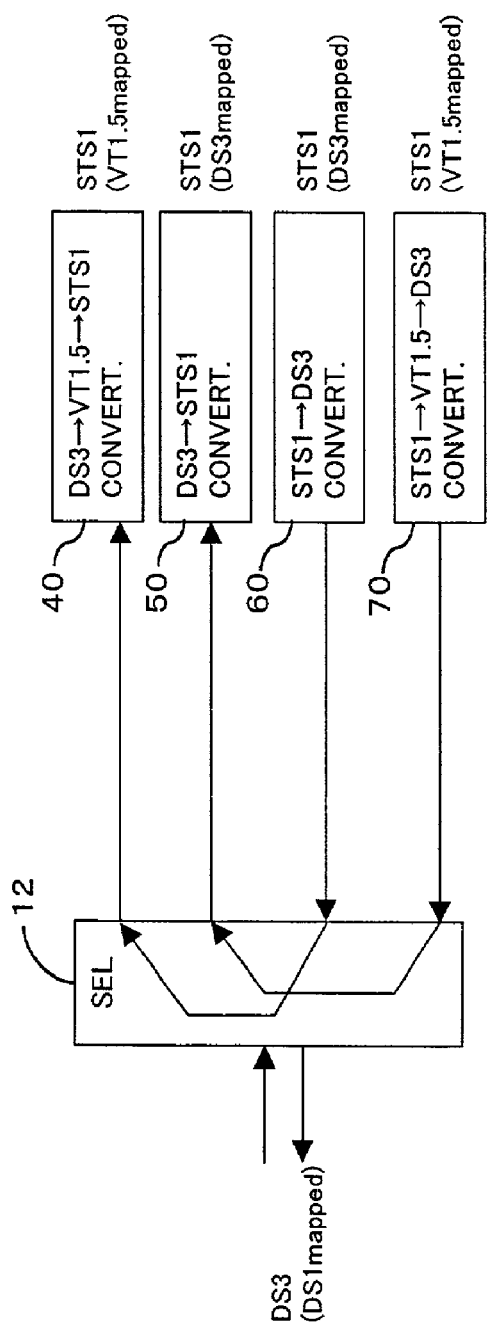
FIG. 4(A)
FIG. 4(B)

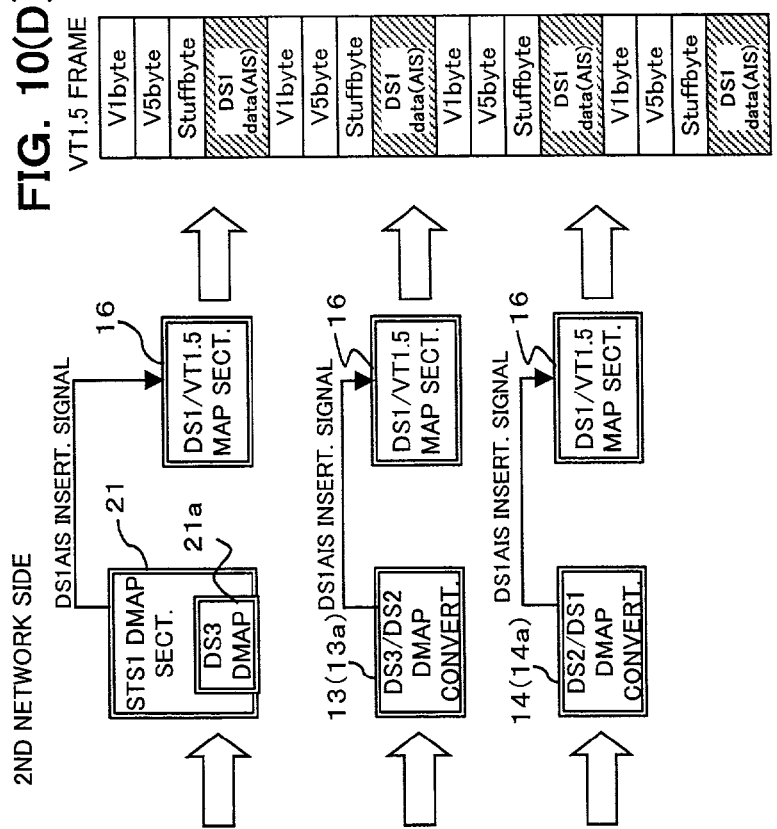
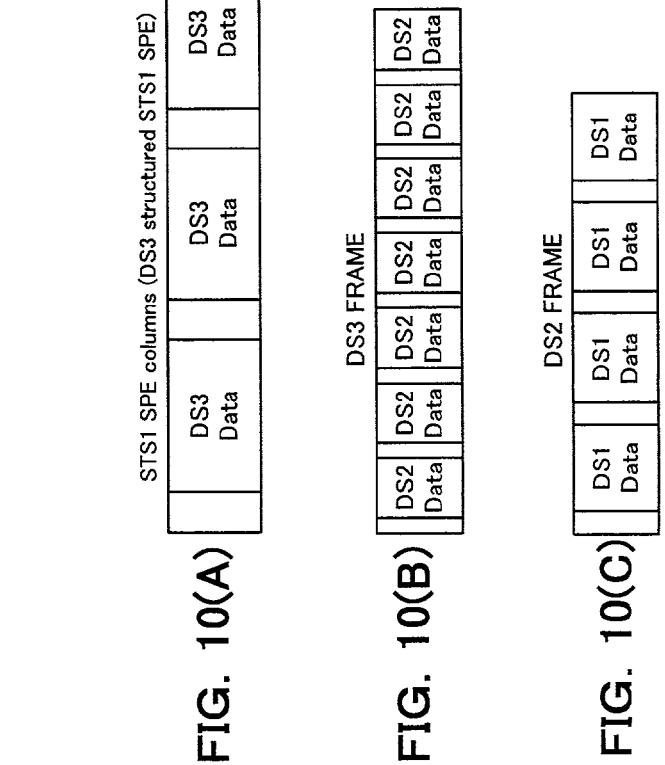
FIG. 10(A)
FIG. 10(B)
FIG. 10(C)
FIG. 10(D)

ADD/DROP MULTIPLEXER AND INTERFACE

BACKGROUND OF THE INVENTION

1. Field of the Invention

The present invention relates to add/drop multiplexers and interfaces, and more particularly to an add/drop multiplexer and an interface which are suitable for connection between an existing digital signal network and a new synchronous network called SONET (Synchronous Optical NETwork).

2. Description of Related Art

The existing transmission networks in North America or other areas are a digital signal network (hereinafter called asynchronous DSn network or DSn network), in which signal transfer takes place in terms of digital signals (DSn; n=1, 2, 3, . . . ) such as DS1 (Digital Signal level 1; 1.544 Mbps), DS2 (6.132 Mbps), DS3 (44.736 Mbps), and a new synchronous network called SONET (Synchronous Optical NETwork), in which signal transfer takes place in terms of synchronous transport signals (STSm; m=1, 3, 12, 48, 192 . . . ) such as STS1 (Synchronous Transport Signal level 1; 51.84 Mbps), STS3 (155.52 Mbps), STS12 (622.08 Mbps).

DS2 signals correspond to the signals on which DS1 signals are mapped by four channels, and DS3 signals correspond to the signals on which DS2 signals are mapped by seven channels. Likewise, STS3 signals correspond to the signal in which STS1 signals are mapped by three channels, STS12 signals correspond to the signals on which STS3 signals are mapped by four channels. Thus in SONET, signal transfer takes place always in terms of STS1 signals, though they are different in number of mapping channels of low-order-group signals.

STSm is a name in electrical signal level, and is alternatively called OCm (Optical Carrier level m) in optical signal level.

As well known in the art, for interconnecting DSn network and SONET, an add/drop multiplexer (ADM) (hereinafter also called ADM node or simply node) are used. For example, as depicted in FIG. 17 of the accompanying drawings, nodes 101, 102 are put into practice which connect asynchronous DS3 network 100 for transfer of DS3 signals and SONET 200 for signal transfer in terms of STS1 signals, in which DS3 signals are mapped over the payload region (SPE: Synchronous Payload Envelope). Namely, as schematically depicted in FIG. 19(A), nodes 101, 102 having a function of mapping DS3 signals on STS1 signals and demapping DS3 signals off DS3-mapped STS1 signals are put into reality.

Now assume that SONET 200 supports services of transfer of VT1.5 signals in terms of STS1 signals. By providing the ADM node 101 or 102 with a function of signal conversion function between DS3 signals and VT1.5 signals and a function of signal mapping/demapping between VT1.5 signals and STS1 signals, it is possible to add DS3 signals, which are to be transferred in DS3 network 100, to SONET 200 by mapping DS3 signals on STS1 signals in terms of VT1.5 signals, and also to drop signals, which are being transferred in SONET 200 as mapped on STS1 signals in terms of VT1.5 signals, to the DS3 network 100 by demapping the last-named signals as VT1.5 signals.

An exemplary arrangement of connection interface of the ADM node 101 (102) is shown in FIG. 18. The node 101 (102) comprises a B/U (Bipolar/Unipolar) converter 111, a DS3/DS2-demapping converter 112, a DS2/DS1-demapping converter 113, a DS1-format-conversion memory 114, a DS1/VT1.5 mapping (MAP) section 115, an STS1 mapping (MAP) section 116, an STS1-network clock generator 117, a SONET-condition notification section 118, an STS1 demapping (DMAP) section 121, a VT1.5/DS1 demapping (DMAP) section 122, a SONET-destuff memory 123, a DS1/DS2-demapping converter 124, a DS2/DS3-demapping converter 125, a U/B (Unipolar/Bipolar) converter 126, a DS1 clock generator 127, and a DS3-network clock generator 128.

The B/U converter 111 converts outside-apparatus bipolar signals (DS3 signals), which are received from the DS3 network 100, into in-apparatus unipolar signals. The DS3/DS2-demapping converter 112 converts the mapped DS3 signals into demapped DS2 signals. The DS2/DS1-demapping converter 113 converts the DS2 signals, which have been obtained by the DS3/DS2-demapping converter 112, into further demapped DS1 signals.

The DS3/DS2-demapping converter 112 and the DS2/DS1-demapping converter 113 respectively detect high-order-group alarms (AIS: alarm indication Signal) with respect to before-demapping-converted high-order-group signals by a DS3 alarm detector 112a and a DS2 alarm detector 113a. Upon detection of a high-order-group alarm by the alarm detector 112a or 113a, the converters 112 and 113 send such message to the SONET condition notification section 118, and output signal (DS1-AIS inserting signal (command)), for inserting AIS in terms of DS1 signal during subsequent mapping (format-converting) of DS1 signals to VT1.5 signals, to the DS1/VT1.5 mapping section 115.

Further, the DS1-format-conversion memory 114 stores the DS1 signals, which have been obtained by the DS2/DS1-demapping converter 113, into a VT1.5-signal format, and the DS1/VT1.5 mapping section 115 reads out from the DS1 signals, which have been stored in the DS1-format-conversion memory 114, in synchronism with clocks, which are generated by the STS1-network clock generator 117, and converts the read-out signals into a VT1.5-signal format.

Furthermore, VT1.5 signals input from the DS1/VT1.5 mapping section 115 are mapped over STS1 signals at VT1.5 mapping section 116a in synchronism with clocks, which are generated by the STS1-network clock generator 117. And the STS1 mapping section 116 outputs the resulting signals to SONET 200 as the VT1.5-mapped STS1 signals.

At that time, if it receives a DS1-AIS inserting signal from the DS3 alarm detector 112a or the DS2 alarm detector 113a, the STS1 mapping section 116 sets all data of the DS1 signals, which are mapped over the DS3 signals or DS2 signals, to "1" (inserts DS1-AIS) and outputs the resulting signals as STS1 signals.

And the SONET-condition notification section 118 serves to notify a network administrator or the like, via a non-illustrated in-apparatus-condition monitor, of the message that an alarm has been detected by the DS3 alarm detector 112a or the DS2 alarm detector 113a.

In the meantime, the STS1 demapping section 121 terminates STS1 signals, which have received from SONET (network supporting transfer of VT1.5 signals) 200, and demapps the terminated STS1 signals in terms of VT1.5 signals by the VT1.5 demapping sub-section 121a. And the VT1.5/DS1 demapping section 122 terminates the VT1.5 signals, which have been obtained by the STS1 demapping section 121 (VT1.5 demapping sub-section 121a), and maps (format-conversion) the terminated VT1.5 signals to DS1 signals.

The STS1 demapping section 121 and the VT1.5/DS1 demapping section 122 respectively detect high-order-group alarms (STS1 alarms with respect to VT1.5 signals, DS1 signals) by an STS alarm detector 121b and a VT alarm detector 122a. Upon detection of a high-order-group alarm by the STS alarm detector 121b or the VT alarm detector 122a, the STS1 demapping section 121 and the VT1.5/DS1 demapping section 122 respectively send DS1-AIS inserting signals to the DS1/DS2-mapping converter 124.

In order to equalizing DS1 signals by absorbing possible stuff of data, which has occurred when destuffing STS1 signals and VT1.5 signals contained in DS1 signals, the SONET-destuff memory 123 stores DS1 signals, which are input from the VT1.5/DS1 demapping section 122, and outputs the input DS1 signals in synchronism with clocks, which are generated by the DS1 clock generator 127. And the DS1/DS2-demapping converter 124 maps the DS1 signals, which have been equalized by the SONET-destuff memory 123, to DS2 signals in synchronism with clocks, which are generated by the DS3-network clock generator 128.

At that time, upon receipt of a DS1-AIS inserting signal from the STS alarm detector 121b or the VT alarm detector 122a, the DS1/DS2-demapping converter 124 sets all data of the DS1 signals, which are mapped over the STS1 signals or DS2 signals, to "1" (inserts DS1-AIS).

And the DS2/DS3-mapping converter 125 converts DS2 signals, which are input from the DS1/DS2-mapping converter 124, into DS3 signals in synchronism with clocks, which are generated by the DS3-network clock generator 128. The U/B converter 126 converts DS3 signals (unipolar signals), which have been obtained by the DS2/DS3-mapping converter 125, into bipolar signals and outputs these resulting signals to the DS3 network 100.

With the foregoing arrangement of the conventional node 101 (102), STS1 signals (STS1-mapped VT1.5), over which VT1.5 signals to be received from SONET 200 have been mapped, are terminated by the STS1 demapping section 121. At that time, upon detection of a high-order-group alarm by the STS alarm detector 121b, a DS1-AIS inserting signal is notified to the DS1/DS2-mapping converter 124.

The STS1 signals terminated by the STS1 demapping section 121 are then demapped in terms of VT1.5 signals by the VT1.5 demapping sub-section 121a, and the resulting signals are output to the VT1.5/DS1 demapping section 122, where VT1.5 signals input from the STS1 demapping section 121 (VT1.5 demapping sub-section 121a) are terminated. At that time, upon detection of a high-order-group alarm by the VT alarm detector 122a, a DS1-AIS inserting signal is notified to the DS1/DS2-mapping converter 124.

Then the terminated VT1.5 signals are input to the SONET-destuff memory 123 after demapped into DS1 signals, whereupon the memory 123 equalizes DS1 signals by absorbing possible stuff of STS1 signals and VT1.5 signals contained in input DS1 signals and are then output to the DS1/DS2-mapping converter 124. Then DS1/DS2-mapping converter 124 converts the equalized DS1 signals into DS2 signals in synchronism with clocks, which are generated by the DS3-network clock generator 128, and outputs the resulting signals to the DS2/DS3-mapping converter 125.

At that time, if received a DS1-AIS inserting signal from the STS alarm detector 121b or the VT alarm detector 122a, the DS1/DS2-mapping converter 124 sets all data of DS1 signals, which are contained in STS1 signals or VT1.5 signals by the DS1-AIS inserting section 124a, to "1" to output STS1 signals.

Then the obtained DS2 signals are converted into DS3 signals by the DS2/DS3-mapping converter 125, and the converted signals are further converted into unipolar signals by the U/B converter 126, whereupon the resulting signals are sent to the DS3 network 100.

In the meantime, DS3 signals received from the asynchronous DS3 network 100 are converted into unipolar signals by the B/U converter 111, and the converted signals are then terminated by the DS3/DS2-demapping converter 112, whereupon the terminated signals are demapped to DS2 signals. During terminating of DS3 signals, upon detection of a high-order-group alarm (DS3 alarm) by the DS3 alarm detector 112a, such message is notified to the SONET-condition notification section 118 and, at the same time, a DS1-AIS inserting signal is sent to the DS1/VT1.5 mapping section 115.

The DS2 signals thus obtained by the DS3/DS2-demapping converter 112 are then terminated by the DS2/DS1-demapping converter 113, whereupon the terminated signals are demapped to DS1 signals. Also in this case, if a high-order-group alarm (DS2 alarm) has been detected by the DS2 alarm detector 113a during termination of the DS2 signals, the DS3/DS2-demapping converter 112 sends such message to the SONET-condition notification section 118 and, at the same time, sends a DS1-AIS inserting signal to the DS1/VT1.5 mapping section 115.

The DS1 signals obtained by the DS2/DS1-demapping converter 113 are then stored in the DS1-format-conversion memory 114 and are read out in synchronism with clocks generated by the STS1-network clock generator 117, whereupon the DS1 signals are mapped (format-conversion) to VT1.5 signals by the DS1/VT1.5 mapping section 115. At that time, if the DS1-AIS inserting signal was received from the DS3 alarm detector 112a or the DS2 alarm detector 113a as mentioned above, the DS1-VT1.5 mapping section 115 sets (inserts DS1-AIS) all the data of the DS1 signals, which are mapped on STS1 signals or DS2 signals by DS1-AIS inserting sub-section 115a, to "1" and then outputs the resulting STS1 signals to the STS1 mapping sub-section 116a.

In the STS1 mapping section 116, the VT1.5 mapping sub-section 116a maps VT1.5 signals, which are from the DS1/VT1.5 mapping section 115, on VT1.5 signals and sends the resulting signals to SONET 200.

The foregoing conventional node 101, 102 realizes signal conversion between DS3 signals and STS1 signals, as schematically depicted in FIG. 19(B). Therefore, as shown in FIG. 17, signal add/drop (cross-connect) can be realized in terms of VT1.5 signals between the DS3 network 100, on which DS3 signals are transferred, and the new synchronous network (SONET) 200, on which signals are transferred in terms of STS1 signals.

However, according to the conventional node 101 (102), because DS3 signals cannot be mapped on STS1 signals to be transferred to SONET 200, it is impossible to realize signal transfer in terms of DS3-mapped STS1 signals in SONET 200 so that services in terms of DS3 signals cannot be provided. Further, because STS1 signals already mapped on DS3 signals in SONET 200 cannot be mapped/demapped (restructured) in terms of VT1.5 signals, it is impossible to provide services, such as signal add/drop (cross-connect), DS3-mapped STS1 signals only in terms of STS1 signals. The foregoing description can be said also in case of SDH (Synchronous Digital Hierarchy) according to TTC (Telecommunication Technology Committee) standards.

SUMMARY OF THE INVENTION

With the foregoing problems in view, it is an object of the present invention to provide an add/drop multiplexer and an interface that can realize not only signal transfer services in terms of low-order-group signals (e.g., DS3 signals) in a new synchronous network but also signal transfer services of low-order-group-signal-mapped signals, which could be hitherto supported only in terms of limited high-order-group signals (e.g., STS1 signals), in terms of new low-order-group signals (e.g., VT1.5 signals), whose transmission speed is slower than that of the already mapped low-order-group signals, by restructuring the first-named low-order-group-signal-mapped signals by mapping with the new low-order-group signals (e.g., VT1.5 signals).

According to a first generic feature of the invention, the above object are accomplished by an add/drop multiplexer for connection between a first network, on which signals of a first low-order group are transferred at a predetermined speed, and a second network, on which signals of a high-order group are transferred at a higher speed than that of the first-low-order-group signals, said multiplexer comprising: a cross-connect for handling cross-connecting of signals to be transferred between the first and second networks in terms of second-low-order-group signals whose transmission speed is slower than that of the high-order-group signals or the first-low-order-group signals; and an interface for handling signal transfer to and from the cross-connect in terms of the high-order-group signals; the interface including the following components:

(1) a first signal converter for converting input signals of the first-low-order-group signals into high-order-group signals, which are to be transferred to the second network and to which second-low-order-group signals slower in transmission speed than that of the first-low-order-group signals are added, and outputting the obtained high-order-group signals to the cross-connect, (2) a second signal converter for converting high-order-group signals, which are received from the second network via the cross-connect, into first-low-order-group signals, and (3) a selector for selectively outputting signals of the first low-order group, which are received from the first network, or the first-low-order-group signals, which are obtained by the second signal converter, as the last-named input signals to the first signal converter.

With the thus constructed add/drop multiplexer, because the second signal converter converts high-order-group signals, which have been received from the second network, into the first low-order-group signals and then inputs the first low-order-group signals to the first signal converter, it is possible to restructure either the first low-order-group signals, which have been received from the first network, or the high-order-group signals, which have been received from the second network, as high-order-group signals by mapping whichever input signals with second low-order-group signals, whose transmission speed is slower than that of the input signals, by the common first signal converter. The resulting high-order-group signals can be transferred to the second network.

Alternatively, the interface may include (1) a third signal converter for converting input signals of the first low-order group into the high-order-group signals to be transferred to the second network, and outputting the obtained high-order-group signals to said cross-connect, (2) a fourth signal converter for converting signals of the high-order group, which are received from the second network, into first-low-order-group signals, which are to be transferred to the first network and to which second-slow-order-group signals slower in transmission speed than that of the first-order-group signals are added, and (3) a selector for selectively outputting signals of the first low-order-group signals, which are received from the first network, or the first-low-order-group signals, which are obtained by the fourth signal converter, as the last-named input signals to the third signal converter.

With this alternative arrangement, because the fourth signal converter converts high-order-group signals, which have been received from the second network, into the first low-order-group signals and then inputs the first low-order-group signals to the third signal converter, it is possible to restructure either the first low-order-group signals, which have been received from the first network, or the high-order-group signals, which have been received from the second network, as high-order-group signals to be transferred to the second network by the common third signal converter.

As another alternative form, the interface may include (1) a first signal converter for converting input signals of the first low-order group into high-order-group signals, which are to be transferred to the second network and to which second-low-order-group signals slower in transmission speed than that of the first low-order-group signals are added, and outputting the obtained high-order-group signals to said cross-connect, (2) a second signal converter for converting high-order-group signals, which are received from the second network via the cross-connect, into first-low-order-group signals, (3) a third signal converter for converting input signals of the first low-order group into high-order-group signals to be transferred to the second network, and outputting the obtained high-order-group signals to the cross-connect, (4) a fourth signal converter for converting high-order-group signals, which are received from the second network, into first-low-order-group signals, which are to be transferred to the first network and to which second-low-order-group signals are added, and (5) a selector for selectively outputting first-low-order-group signals, which are received from the first network, or first-low-order-group signals, which are obtained by the second signal converter, as the first-named input signals to the first signal converter, the selector being operable also to selectively output signals of the first low-order group, which are received from the first network, or signals of the first low-order group, which are obtained by the fourth signal converter, as the second-named input signals to the third signal converter.

With this second alternative arrangement, because the second signal converter converts high-order-group signals, which have been received from the second network, into the first low-order-group signals and then inputs the first low-order-group signals to the first signal converter, it is possible to restructure either the first low-order-group signals, which have been received from the first network, or the high-order-group signals, which have been received from the second network, as high-order-group signals to be transferred to the second network by mapping whichever input signals with second low-order-group signals, whose transmission speed is slower than that of the input signals, by the common first signal converter. And because the fourth signal converter converts high-order-group signals, which have been received from the second network, into the first low-order-group signals and then inputs the first low-order-group signals to the third signal converter, it is possible to restructure either the first low-order-group signals, which have been received from the first network, or the high-order-group signals, which have been received from the second network, as high-order-group signals to be transferred to the second network by the common third signal converter.

As a preferred specific feature, the second signal converter may include an alarm detector for detecting an alarm with respect to the high-order-group signals during the conversion of the high-order-group signals from the second network into the first-low-order-group signals, and the first signal converter may include an alarm-indication-status setting section, responsive to the detection of an alarm with respect to the high-order-group signals by the alarm detector, for setting second-low-order-group signals, which are to be added to the high-order-group signals while first-low-order-group signals to be selected and outputted by the selector are converted into the high-order-group signals, as those assuming an alarm indication status.

Upon detection of an alarm with respect to the high-order-group signals, which have been received from the second network and are to be converted (restructured) from the first low-order-group signals selected and output by the selector, by the second signal converter, it is possible to set the second low-order-group signals, which are to be mapped on the high-order-group signals for the restructuring, in such a manner that the whole second low-order-group signals assumes an alarm indication status, at the first signal converter.

According to a second generic feature, there is provided an interface for connection between a first network, on which signals of a first low-order group are transferred at a predetermined speed, and a second network, on which signals of a high-order group are transferred at a higher speed than that of the first low-order-group signals, the interface comprising:
  (1) a first signal converter for converting input signals of the first low-order group into high-order-group signals, which is to be transferred to the second network and to which second-low-order-group signals slower in transmission speed than that of the first low-order-group signals are added;
  (2) a second signal converter for converting high-order-group signals, which are received from the second network, into the first-low-order-group signals; and
  (3) a selector for selectively outputting first-low-order-group signals, which are received from the first network, or first-low-order-group signals, which are obtained by said second signal converter, as the last-named input signals to the first signal converter.

With the thus constructed interface, because the second signal converter converts high-order-group signals, which have been received from the second network, into the first low-order-group signals and then inputs the first low-order-group signals to the first signal converter, it is possible to restructure either the first low-order-group signals, which have been received from the first network, or the high-order-group signals, which have been received from the second network, as high-order-group signals by mapping whichever input signals with second low-order-group signals, whose transmission speed is slower than that of the input signals, by the common first signal converter. The resulting high-order-group signals can be transferred to the second network.

According to the add/drop multiplexer and interface of the present invention, in the second network supporting transfer of first low-order-group signals in the first network, it is possible to provide transfer services of the first low-order-group signals and also to restructure high-order-group signals, which have already been mapped with first low-order-group signals and could hitherto be supported only in terms of limited high-order-group signals, as a new high-order-group signals by mapping second low-order-group signals whose transmission speed is slower than that of the first low-order-group signals.

It is accordingly possible not only to meet demands for an add/drop multiplexer that can exercise the first network and realize mapping/demapping process in terms of second low-order-group signals in the second network supporting the second low-order-group signals, but also to support cross-connect services of even input first low-order-group signals, which have already been mapped on high-order-group signals in the second network, in terms of second low-order-group signals by restructuring the input first low-order-group signals in terms of the second low-order-group signals, requiring no dedicated equipment for signal restructuring.

Further, because first low-order-group signals, which are obtained by signal conversion from high-order-group signals received from the second network, and first low-order-group signals received from the first network can be selectively converted into high-order-group signals and outputted the resulting high-order-group signals to the second network, it is possible to restructure the second-low-order-group-signal-mapped high-order-group signals as first-low-order-group-signal-mapped high-order-group signals.

Still further, because either first low-order-group signals received from the first network or high-order-group signals received from the second network can be restructured as second-low-order-group signal-mapped high-order-group signals for transfer to the second network or first-low-order-group-signal-mapped high-order-group signals for transfer to the second network, it is possible to realize restructure of necessary signals not only without requiring dedicated equipment for signal restructuring but also without increasing the apparatus size.

Furthermore, because, upon detection of an alarm with respect to high-order-group signals, which have been received from the second network and are to be restructured, by the second signal converter, second low-order-group signals to be mapped on the high-order-group signals by the restructure can be set in such a manner that the whole second low-order-group signals assume an alarm indication status, it is possible to downsize the circuit size and hence to suppress any increase of power consumption.

BRIEF DESCRIPTION OF THE DRAWINGS

FIG. 4(A) illustrates the switching operation of a selector of the interface of FIG. 3 when connecting lines in "non-server mode";

FIG. 4(B) illustrates the switching operation of the selector of FIG. 3 when connecting lines in "server mode";

FIGS. 10(A) through 10(D) each illustrate the manner in which an alarm is inserted in the interface of FIG. 3;

DESCRIPTION OF THE PREFERRED EMBODIMENTS

Embodiments of the present invention will now be described with reference to the accompanying drawings.

Figure 1:
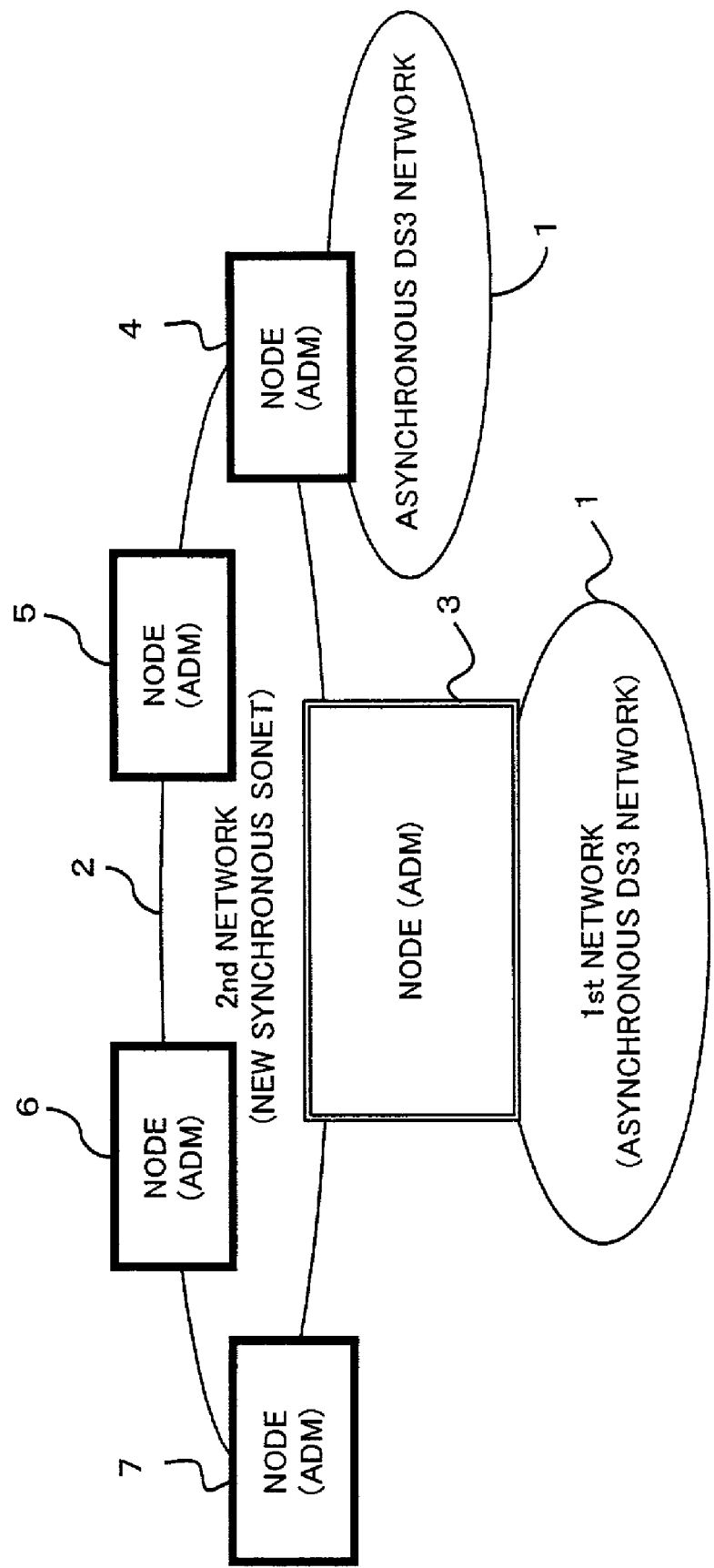
FIG. 1 is a block diagram showing a network according to one embodiment of the present invention.

FIG. 1 is a block diagram showing a network according to one embodiment of the present invention. The network of FIG. 1 is a composite network that includes a first network in the form of an asynchronous DS3 network (hereinafter also called DS3 network) 1, which supports transfer of (first) low-order-group signals (DS3 signals) having a transmission speed of 44.736 Mbps, and a second network in the form of a new synchronous network (SONET) 2, which is not in synchronism with the asynchronous DS3 network 1 and supports signal transfer in terms of high-order-group signals (STS1 signals) having a higher transmission speed than that of the DS3 network 1.

SONET 2 is constituted by a plurality of add/drop multiplexers (hereinafter also called ADM nodes) 3 through 7 connected one to the next to form a ring network. Of these ADM nodes 3 through 7, the ADM nodes 3, 4 respectively accommodate the DS3 network 1. The individual ADM node 3, 4 converts DS3 signals, which are supported by the DS3 network 1, into STS1 signals mapped with VT1.5 signals (second low-order-group signals) having a slower transmission speed than that of the DS3 signals, so that the VT1.5-mapped STS1 signals can be transferred onto SONET 2. Inversely, the individual ADM node 3, 4 converts the VT1.5-mapped STS1 signals, which are supported by SONET 2, into the DS3 signals for transfer onto the DS3 network 1.

Further, the individual ADM node 3 serves, in addition to the function of signal conversion between the DS3 signals and the VT1.5-mapped STS1 signals, to map the DS3 signals, which are received from the DS3 network 1, on STS1 signals in terms of DS3 signals for transfer onto SONET 2 and also to converts (restructure) the DS3-mapped STS1 signals on SONET 2 into the VT1.5-mapped STS1 signals for transfer onto SONET 2.

Figure 2:
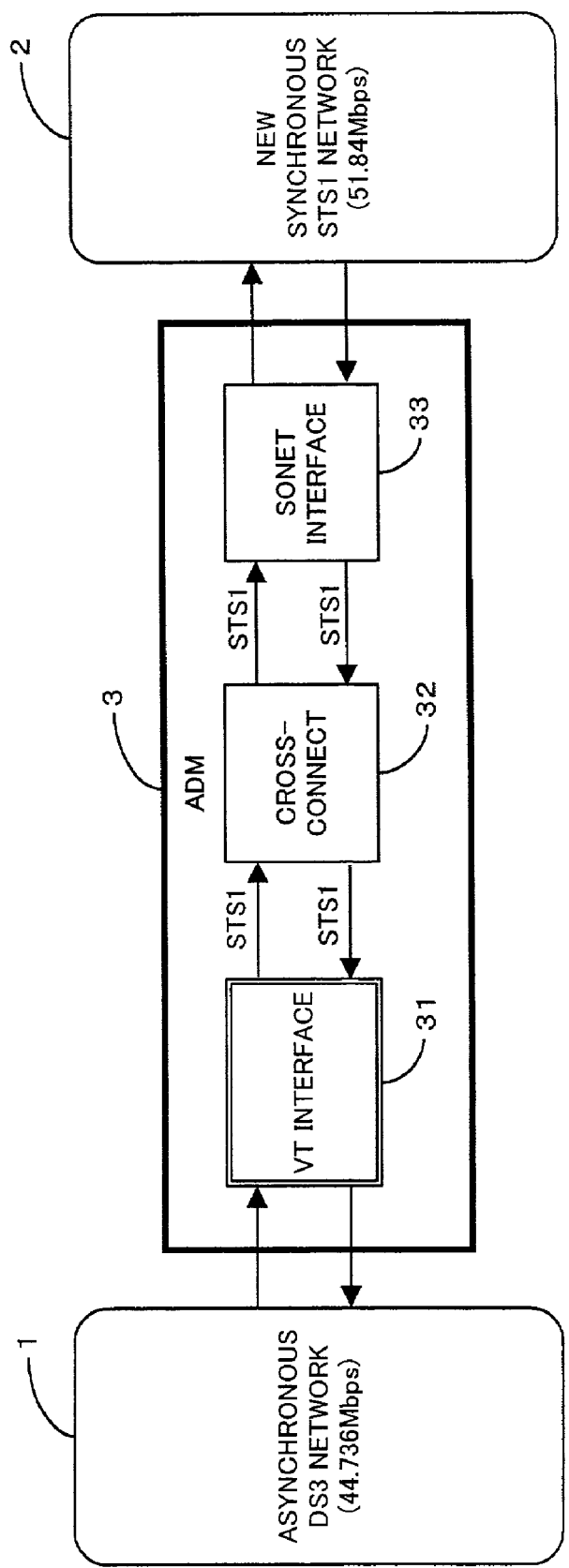
FIG. 2 is a block diagram showing an add/drop multiplexer (hereinafter also called ADM) of FIG. 1.

Specifically, the ADM node 3 includes, as shown in FIG. 2, a VT interface 31 for performing the above-mentioned various functions, a cross-connect 32 for providing a cross-connecting function, and a SONET interface 33, connected to SONET 2, for interfacing with SONET 2. Basically, between the VT interface 31, the cross-connect 32 and the SONET interface 33, in-ADM communication takes place in terms of STS1 signals; in the cross-connect 32, cross-connecting takes place in terms of STS1 or VT1.5 signals.

Figure 3:
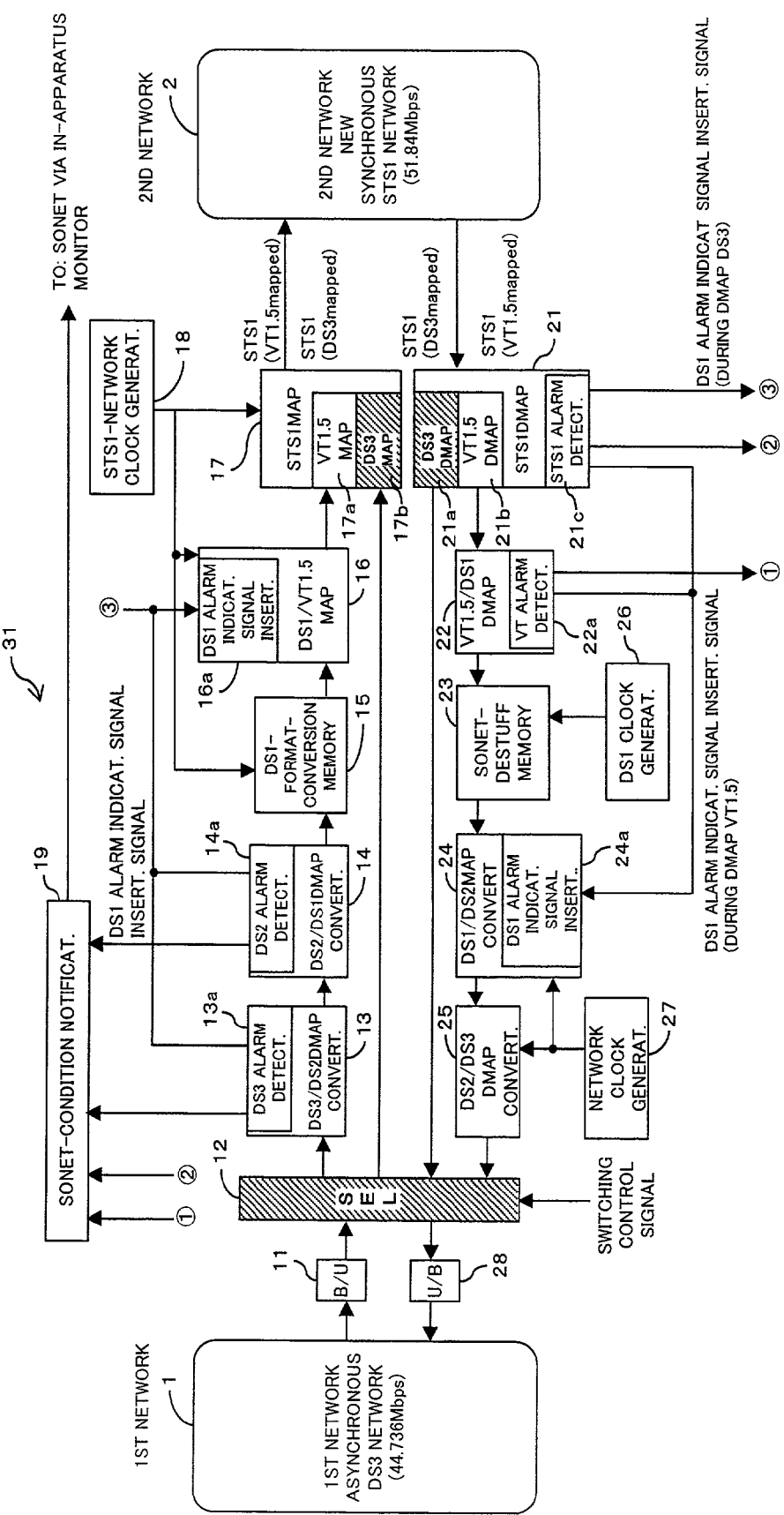
FIG. 3 is a block diagram showing an interface of ADM of FIG. 2.

The VT interface 31 will now be described in detail with reference to FIG. 3.

Namely, the VT interface 31 interfacing the DS3 network 1 and SONET 2 comprises, as basic components of the system of transferring signals from the DS3 network 1 to SONET 2 (signal-sending direction), a B/U converter 11, a DS3/DS2-demapping converter 13 having a DS3-alarm detector 13a, a DS2/DS1-demapping converter 14 having a DS2-alarm detector 14a, a DS1-format-conversion memory 15, a DS1/VT1.5 mapping section 16 having a DS1-AIS inserting sub-section 16a, and an STS1 mapping section 17 having a VT1.5 mapping sub-section 17a and a DS3 mapping sub-section 17b.

The VT interface 31 further comprises, as basic components of a system of transferring signals from SONET 2 to the DS3 network 1 (signal-receiving direction), an STS1-network clock generator 18, an STS1 demapping section 21 having a DS3 mapping sub-section 21a and a VT1.5 demapping sub-section 21b, a VT1.5/DS1 demapping section 22 having a VT-alarm detector 22a, a SONET-destuff memory 23, a DS1/DS2-mapping converter 24 having a DS1-AIS inserting sub-section 24a, a DS2/DS3-mapping converter 25, a DS1 clock generator 26, a DS3-network clock generator 27, and a U/B converter 28.

Further, the VT interface 31 comprises, in addition to these transfer system components, a selector (SEL) 12 and a SONET-condition notification section 19. In FIG. 3, the cross-connect 32 and the SONET interface 33 of FIG. 2 are omitted for clarity. Practically, STS1 signals to be output from the STS1 mapping section 17 are sent out to SONET 2 after processed with necessary cross-connecting by the cross-connect 32 and also with necessary interfacing by the SONET interface 33, and, inversely, STS1 signals to be received from SONET 2 are input to the VT interface 31 after processed with necessary interfacing by the SONET interface 33 and with necessary cross-connecting by the cross-connect 32.

In the above-mention signal-sending system, the B/U converter 11 converts DS3 signals (outside-apparatus bipolar signals), which are to be received from the DS3 network 1, into in-apparatus unipolar signals, and the DS3/DS2-demapping section 13 terminates DS3 signals to be input from the selector 12 and converts the DS3 signals into DS2 signals by demapping the DS3 signals. And the DS3 alarm detector 13a detects a high-order-group alarm (for example, a DS3 alarm is a high-order-group alarm as seen from DS2 signals) during termination of the DS3 signals. Upon detection of a DS3 alarm by the DS3 alarm detector 13a, such a message is notified to the SONET-condition notification section 19 and, at the same time, a DS1-AIS inserting signal is sent to the DS1-AIS inserting section 16a of the DS1/VT1.5 mapping section 16a.

And the DS2/DS1-demapping converter 14 terminates the DS2 signals obtained by the DS3/DS2-demapping converter 13 and converts the DS2 signals into DS1 signals by demapping, and the DS2 alarm detector 14a detects a high-order-group alarm (for example, a DS2 alarm is a high-order-group alarm as seen from DS1 signals) during termination of the DS2 signals. Upon detection of a DS2 alarm by the DS2 alarm detector 14a, likewise the DS3 alarm detector 13a, such a message is notified to the SONET-condition notification section 19 and, at the same time, a DS1-AIS inserting signal is sent to the DS1-AIS inserting section 16a.

Further, the DS1-format-conversion memory 15 (hereinafter also called "conversion memory 15") stores input DS1 signals from the DS2/DS1-demapping converter 14 to compensate a frequency offset occurred while DS3 signals are converted into DS1 signals by demapping. The contents of storage of the conversion memory 15 are successively output in synchronism with clocks that are generated by the STS1-network clock generator (hereinafter also called "STS1 clock generator") 18 in synchronism with the data mission speed of SONET 2.

And the DS1/VT1.5 mapping section 16 converts input DS1 signals, which are read out from the conversion memory 15, into VT1.5 signals, in synchronism with clocks generated by the STS1 clock generator 18, by mapping. Upon receipt of a DS1-AIS inserting signal during that time, the DS1-AIS inserting section (alarm-indication-status setting section) 16a sets all the data of the DS1 signals (DS1 data), which have been mapped on DS2 signals, to "1" (namely, insert AIS into DS2 signals in terms of DS1 data).

Further, the STS1 mapping section 17 maps input signals on STS1 signals, which are to be transferred to SONET 2, in synchronism with the clocks generated by the STS1 clock generator 18. Specifically, input VT1.5 signals from the DS1/VT1.5 mapping section 16 are mapped on STS1 signals in the VT1.5 mapping sub-section, and input DS3 signals selected by the selector 12 in a manner described later are mapped on STS1 signals in the DS3 mapping sub-section 17b.

In the signal-receiving system, the STS1 demapping section 21 terminates STS1 signals, which have been received from SONET 2 via the SONET interface 33 and the cross-connect 32, and terminates and demaps DS3 signals or VT1.5 signals mapped on the first-terminated STS1 signals. The STS1 signals mapped with the DS3 signals are demapped in the DS3 demapping sub-section 21a, and the STS1 signals mapped with the VT1.5 signals are demapped in the STS1 demapping sub-section 21a. The DS3 signals demapped off the STS1 signals in the DS3 demapping sub-section 21a are output directly to the selector 12.

And the STS1 alarm detector 21c detects a high-order-group alarm (an STS1 alarm is a high-order-group alarm as seen from whichever DS3 signals or VT1.5 signals) during termination of DS3 signals or VT1.5 signals. Upon detection of an STS1 alarm by the STS1 alarm detector 21c, such a message is notified to the SONET-condition notification section 19; if the STS1 alarm is detected during termination of the VT1.5 signals, a DS1-AIS inserting signal also is sent to the DS1-AIS inserting sub-section 24a of the DS1/DS2-mapping converter 24, and otherwise if the STS1 alarm is detected during termination of the DS3 signals, a DS1-AIS inserting signal also is sent to the DS1-AIS inserting sub-section 16a of the DS1/VT1.5 mapping section 16.

Further, the VT1.5/DS1 demapping section 22 terminates input VT1.5 signals from the VT1.5 demapping sub-section 21b and converting the terminated VT1.5 signals into DS1 signals by demapping, and the VT alarm detector 22a detects a high-order-group alarm (a VT1.5 alarm is a high-order-group alarm as seen from DS1 signals) during termination of VT1.5 signals. Upon detection of a VT1.5 alarm by the VT alarm detector 22a, such a message is notified to the SONET-condition notification section 19 and, at the same time, a DS1-AIS inserting signal is sent to the DS1/DS2-mapping converter 24.

And the SONET-destuff memory 23 (hereinafter also called "destuff memory 23") stores input DS1 signals from the VT1.5/DS1 demapping section 22 in order to smooth DS1 signals by absorbing (compensating a frequency offset) data staggering occurred during destuff of STS1 signals and VT1.5 signals contained in the input DS1 signals. The DS1/DS2-mapping converter 24 converts the smoothed DS1 signals, which are input from the destuff memory 23, into DS2 signals in synchronism with the clocks, which are generated by the DS3-network clock generator (hereinafter also called "DS3 clock generator") 27 and are synchronous with the data transmission speed of the DS3 network 1, by mapping.

Further, upon receipt of a DS1-AIS inserting signal from the STS1 alarm detector 21c or the VT alarm detector 22a while the DS1 signals are converted into DS2 signals by mapping, the DS1-AIS inserting sub-section 24a sets all the data of DS1 signals in the DS2 signals to "1" (inserts DS1-AIS).

And the DS2/DS3-mapping converter 25 converts the DS2 signals, which have been obtained by the DS1/DS2-mapping section 24, into DS3 signals in synchronism with the clocks, which are generated by the DS3 clock generator 27, by mapping. The U/B converter 28 converts input DS3 signals (in-apparatus bipolar signals), which are received from the selector 12 and are to be transferred to the DS3 network 1, into outside-apparatus unipolar signals and outputs the unipolar signals to the DS3 network 1.

In the following description, the system composed of the DS3/DS2-demapping converter 13, the DS2/DS1-demapping converter 14, the conversion memory 15, the DS1/VT1.5 mapping section 16 and the STS1 mapping section 17 (VT1.5 mapping sub-section 17a) is called "DS3-to-VT1.5-to-STS1 converter (first signal converter) 40"; the DS3 mapping sub-section 17b of the STS1 mapping section 17, "DS3-to-STS1 converter (third signal converter) 50"; the DS3 demapping sub-section 21a of the STS1 demapping section 21, "STS1-to-DS3 converter (second signal converter) 60"; and the system composed of the STS1 demapping section 21 (VT1.5 demapping section 21b), the VT1.5/DS1 demapping section 22, the destuff memory 23, the DS1/DS2-mapping converter 24, and the DS2/DS3-mapping converter 25, "STS1-to-VT1.5-to-DS3 converter (fourth signal converter) 70" (see FIGS. 4(A) and 4(B)).

The selector 12 performs switching of connection between the DS3 network 1 and the individual converters 40, 50, 60, 70. For example, to realize demapping/mapping of signals between DS1-mapped DS3 signals, which are to be received from the DS3 network 1, and VT1.5-mapped STS1 signals, which are to be received from SONET 2, the selector 12 ly outputs the DS3 signals from the DS3 network 1 to the DS3-to-VT1.5-to-STS1 converter 40 and outputs the DS3 signals from the STS1-to-DS3 converter 70 to the U/B converter 28 (this connection is called "line-side connection"), as shown in FIG. 4(A).

Inversely, to restructure the STS1 signals, on which DS3 signals (or VT1.5 signals) have already been mapped in SONET 2, into VT1.5-mapped (or DS3-mapped) STS1 signals, the selector 12 outputs the DS3 signals, which have been obtained by the STS1-to-DS3 converter 60, as input signals turning back to the DS3-to-VT1.5-to-STS1 converter 40, and outputs the DS3 signals, which have been obtained by the STS1-to-VT1.5-to-DS3 converter 70, as input signals turning back to the DS3-to-STS1 converter 50 (this connection is called "loop-side connection"), as shown in FIG. 4(B).

Specifically, for the line-side connection of FIG. 4(A), the selector 12 selectively outputs, of the DS3 signals from the DS3 network 1 and the DS3 signals from the STS1-to-DS3 converter 60, the former to the DS3-to-VT1.5-to-STS1 converter 40, and, of the DS3 signals from the STS1-to-DS3 converter 60 and the DS3 signals from the STS1-to-VT1.5-to-DS3 converter 70, the latter to the U/B converter 28. Otherwise for the loop-side connection of FIG. 4(B), the selector 12 selectively outputs, of the DS3 signals from the DS3 network 1 and the DS3 signals from the STS1-to-DS3 converter 60, the latter to the DS3-to-VT1.5-to-STS1 converter 40, and, of the DS3 signals from the DS3 network 1 and the DS3 signals from the STS1-to-VT1.5-to-DS3 converter 70, the latter to the DS3-to-STS1 converter 50.

Namely, the selector 12 serves to output the DS3 signals from the DS3 network 1 or the DS3 signals obtained by the STS1-to-DS3 converter 60, whichever selected, as input signals to the DS3-to-VT1.5-to-STS1 converter 40, and also serves to output the DS3 signals from the DS3 network 1 or the DS3 signals obtained by the STS1-to-VT1.5-to-DS3 converter 70, whichever selected, as input signals to the STS1-to-DS3 converter 60.

It is possible to restructure either the DS3 signals, which are received from the DS3 network 1, or the DS3 signals, which are received as the DS3-mapped STS1 signals and obtained as converted by the STS1-to-DS3 converter 60, into the VT1.5-mapped STS1 signals, which are to be transferred to SONET 2, by the common DS3-to-VT1.5-to-STS1 converter 40, thus realizing restructure of necessary signals not only with no additional equipment dedicated to restructuring but also with no increase of the whole apparatus size.

It is also possible to restructure either the DS3 signals, which are received from the DS3 network 1, or the DS3 signals, which are received as the DS3-mapped STS1 signals and obtained as converted by the STS1-to-VT1.5-to-DS converter 70, into the DS3-mapped DS3 signals, which are to be transferred to SONET 2, by the common DS3-to-STS1 converter 50, thus realizing restructure of necessary signals not only with no additional equipment dedicated to restructuring but also with no increase of the whole apparatus size.

Upon receipt of the message that an STS1 alarm, a DS3 alarm, a DS2 alarm or a VT alarm has been detected by the individual alarm detector 21c, 13a, 14a, 22a, the SONET-condition notification section 19 sends a message of occurrence of an alarm to SONET 2 via a non-illustrated in-apparatus-condition monitor, notifying a network administrator of such a message.

The operation of the thus constructed ADM node 3 (VT interface 31) of the present invention will now be described in detail; but the description of processes of the cross-connect 32 and SONET interface 33 is omitted here.

(1) Switching Operation of Selector 12

The switching operation of the selector 12 takes place when line setting. Line setting to be accompanied by the switching operation of the selector 12 takes place for two occasions; one when a network administrator makes line setting, and the other when a fault occurs on a transfer route.

Figure 5:
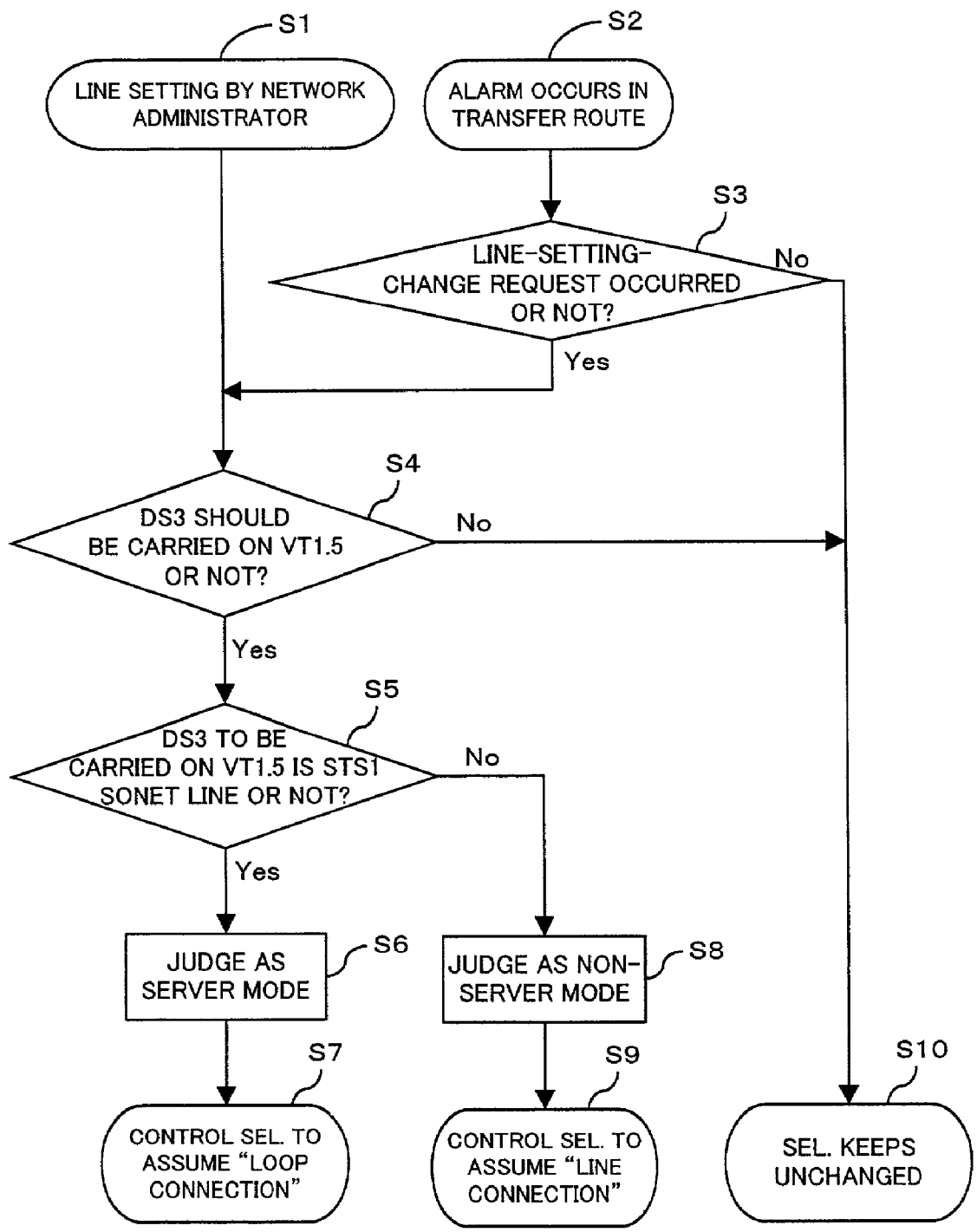
FIG. 5 is a flow diagram illustrating the manner in which the selector of FIG. 3 works.

Specifically, the selector 12 is controlled to perform the switching operation as a non-illustrated network administration section operates according to the flow diagram of FIG. 5. For example, if a line-setting command is input by the network administrator as through a maintenance terminal (step S1) or if a line-setting-change request occurs (step S3) as a fault (alarm) occurs on the transfer route (step S2), the network administration section discriminates, based the above-mentioned command or request, whether or not it is essential to carry DS3 signals as VT1.5 signals (step S4). If the result of the discrimination is positive, the network administration section further discriminates whether or not DS3 signals to be carried as VT1.5 signals are STS1 signals for SONET 2 (from YES route of step S4 to step S5).

If the result of the second discrimination is positive, the network administration section judges that it is necessary to restructure DS3 signals, which have already mapped on STS1 signals for SONET 2, as VT1.5-mapped STS1 signals and to transfer (return) the resulting signals to SONET 2 (this is called "server mode") (from YES route of step S5 to step S6), and then gives a loop-side-selection control signal to the selector 12, controlling the selector 12 in such a manner that the selector 12 assumes "loop connection" of FIG. 4(B) (step S7).

Otherwise if the result of the second discrimination is negative, namely, DS3 signals to be carried as VT1.5 signals are not STS1 signals for SONET 2, the network administration section judges the DS3 network 1 as "non-server mode" supporting SONET 2 (from NO route of step S5 to step S8), and then gives a line-side-selection control signal to the selector 12, controlling the selector 12 in such a manner that the selector 12 assume "line connection" of FIG. 4(A) (step S9).

If any line-setting-change request due to occurrence of an alarm has occurred (NO route of step S3) or if it is unnecessary to carry DS3 signals as VT1.5 signals (NO route of step S4), the selector 12 keeps the current line connection (step S10). Various causes for occurrence of a line-setting-change request will be described later.

The operation of ADM node 3 (VT interface 31) will now be described in detail.

(2) Operation in Non-Server Mode

In non-server mode supporting the DS3 network 1 for SONET 2, the selector 12 is controlled so as to assume "line connection" of FIG. 4(A) (step S1, YES route of step S4, NO route of step 5, step S9 in FIG. 5); DS3 signals received from the DS3 network 1 are therefore converted into in-apparatus unipolar signals from outside-apparatus bipolar signals by the B/U converter 11, whereupon the resulting signals are output to the DS3/DS2-demapping converter 13 via the selector 12.

Then the DS3/DS2-demapping converter 13 terminates DS3 signals input from the selector 12, and the DS3 alarm detector 13a discriminates whether or not any alarm has occurred with DS3 signals. If the result of the discrimination by the DS3 alarm detector 13a is positive, such a message is given to the SONET-condition notification section 19, and a DS1-AIS inserting signal is sent to the DS1-AIS inserting sub-section 16a of the DS1/VT1.5 mapping section 16.

Figure 6:
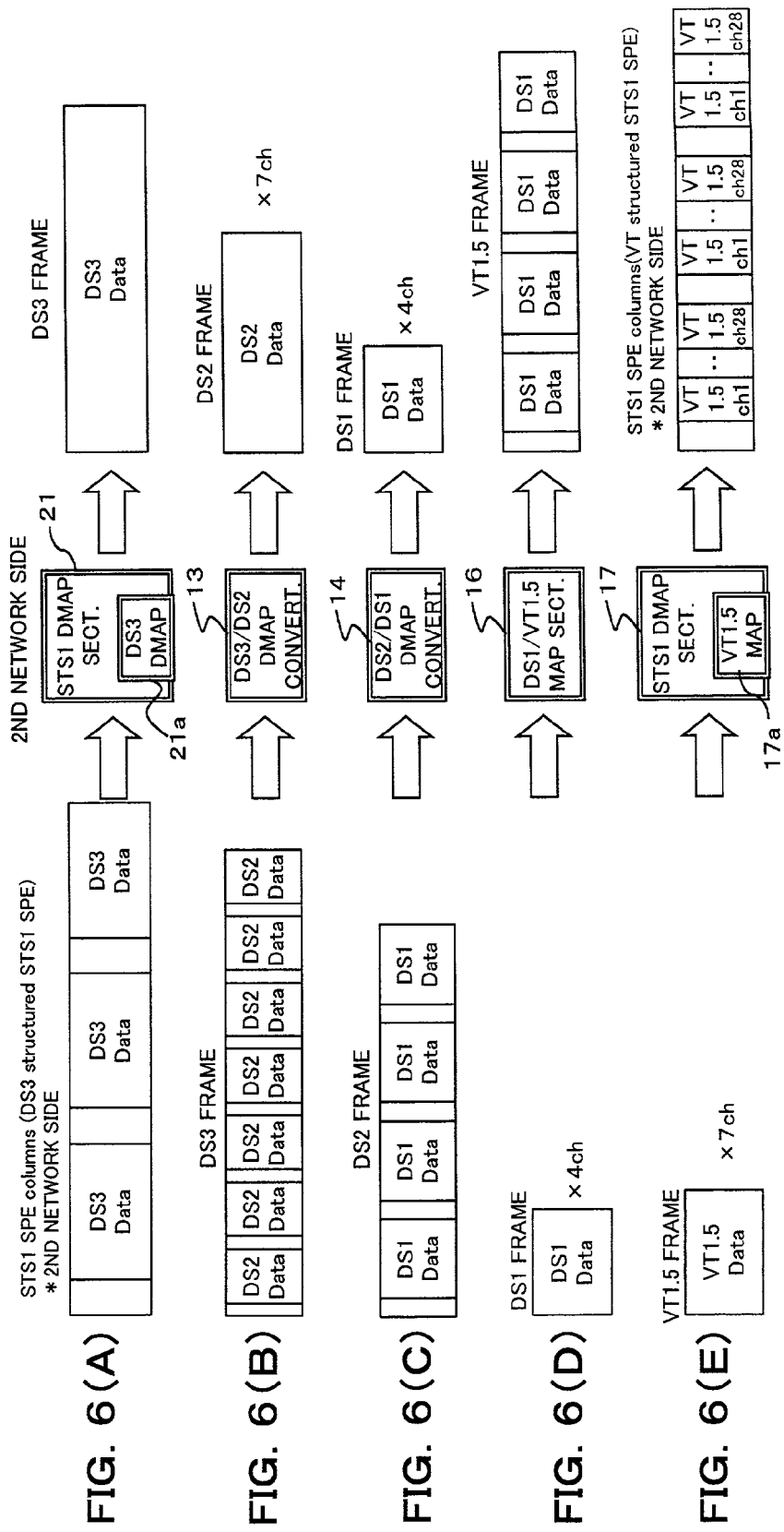
FIGS. 6(A) through 6(E) each illustrate the manner in which signals are converted in format in the interface of FIG. 3.
Figure 9:
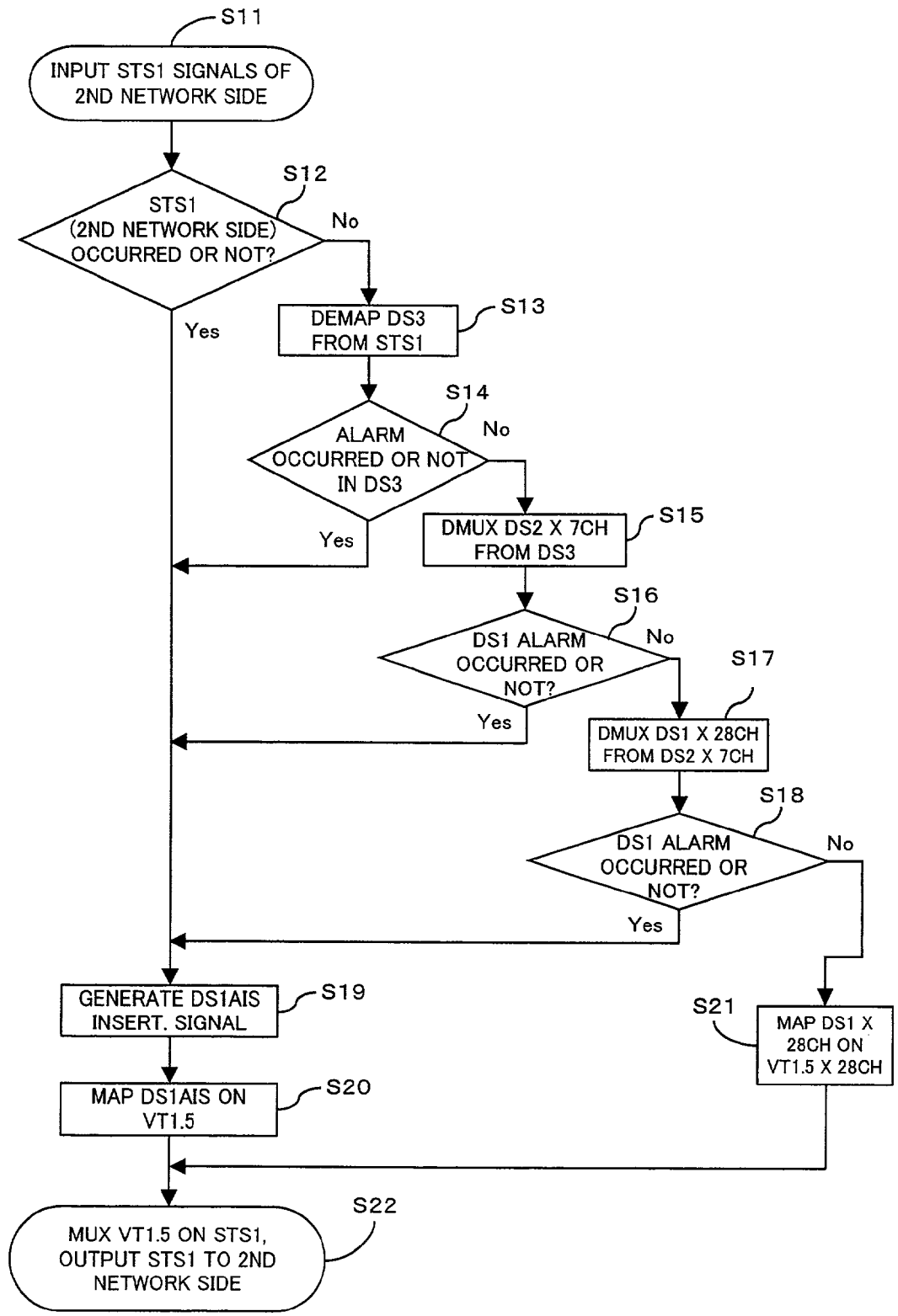
FIG. 9 is a flow diagram illustrating the manner in which signals are converted in format in the interface of FIG. 3 upon occurrence of an alarm.

Otherwise if the result of the discrimination by the DS3 alarm detector 13a is negative, (DS2 signals)×7 ch (channels) are demapped from DS3 signals (e.g., corresponding to the procedure of step S15 from NO route of step S14 in FIG. 9) as schematically depicted in FIG. 6(B).

The thus obtained DS2 signals are then terminated by the DS2/DS1-demapping converter 14, it is discriminated by the DS2 alarm detector 14a whether or not any a alarm has occurred with DS2 signals. If the result of discrimination by the DS2 alarm detector 14a is positive, a DS2 alarm has occurred, such a message is given to the SONET-condition notification section 19 and, at the same time, a DS1-AIS inserting signal is sent to the DS1-AIS inserting sub-section 16a. Otherwise if the result of discrimination by the DS2 alarm detector 14a is negative, (DS1 signals)×28 ch (channels) are demapped from (DS2 signals)×7 ch (e.g., corresponding to the procedure of step S17 from NO route of step S16 in FIG. 9) as schematically depicted in FIG. 6(c).

The obtained DS1 signals are temporarily stored in the conversion memory 15 and are then output to the DS1/VT1.5 mapping section 16 where it is discriminated whether or not any alarm has occurred with the DS1 signals. If the result of discrimination in the DS1/VT1.5 mapping section 16 is positive (or if a DS1-AIS inserting signal has been received by the DS1-AIS inserting sub-section 16a), the DS1-AIS inserting sub-section 16a generates VT1.5 signals with DS1-AIS mapped thereon and then outputs the resulting VT1.5 signals to the STS1 mapping section 17 (VT1.5 mapping section 17a).

Otherwise if the result of discrimination in the DS1/VT1.5 mapping section 16 is negative, (DS1 signals)×28 ch are mapped on (VT1.5 signals)×28 ch (e.g., corresponding to the procedure of step S21 from NO route of step S18 in FIG. 9) in synchronism with clocks generated by the STS1 clock generator 18, as schematically depicted in FIG. 6(D).

The VT1.5 signals thus obtained by the DS1/VT1.5 mapping section 16 are input to the STS1 mapping section 17 where the VT1.5 signals are converted into STS1 signals by mapping in synchronism with clocks generated by the STS1 clock generator 17, and the resulting STS1 signals are then transferred to SONET 2. Namely, in the STS1 mapping section, (VT1.5 signals)×28 ch are mapped on STS1 signals (corresponding to the procedure of step S22 in FIG. 9) as schematically depicted in FIG. 6(E).

The VT1.5-mapped STS1 signals received from SONET 2 are terminated by the STS1 demapping section 21. And if a high-order-group alarm (STS1 alarm) is detected by the STS1 alarm detector 21c, such a detection message is given to the SONET-condition notification section 19 and, at the same time, a DS1-AIS inserting signal is sent to the DS1-AIS inserting sub-section 24a of the DS1/DS2-mapping converter 24. If any high-order-group (STS1) alarm has not occurred, (VT1.5 signals)×7 ch are demapped from the STS1 signals in VT1.5 demapping sub-section 21b as schematically depiected in FIG. 7(A).

Figure 7:
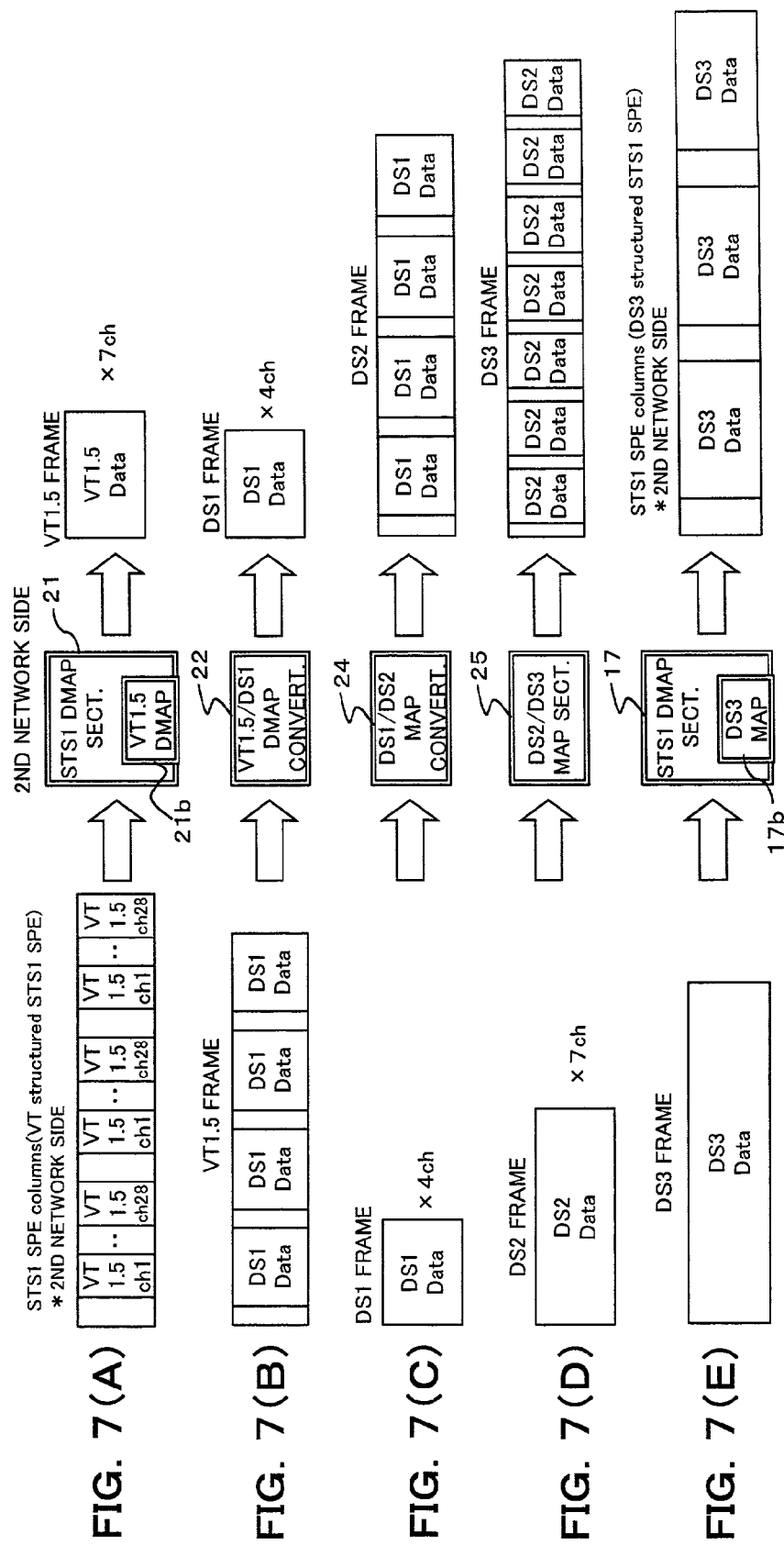
FIGS. 7(A) through 7(E) each illustrate the manner in which signals are converted in format in the interface of FIG. 3.

The thus obtained VT1.5 signals are terminated by the VT1.5/DS1 demapping section 22. And the VT alarm detector 22a discriminates whether or not an alarm has occurred with VT1.5 signals. If the result of discrimination by the VT alarm detector 22a is positive, such a message is given to the SONET-condition notification section 19 and, at the same time, a DS1-AIS inserting signal is sent to the DS1-AIS inserting sub-section 24a. Otherwise if the result of discrimination by the VT alarm detector 22a is negative, (DS1 signals)×4 ch are demapped from the VT1.5 signals as schematically depicted in FIG. 7(B).

Subsequently, the obtained DS1 signals are temporarily stored in the destuff memory 23, and the STS1 signals and stuff in VT1.5 level, which are contained the DS1 signals, are absorbed to smooth the DS1 signals as the DS1 signals are read in accordance with the clocks from the DS1 clock generator 26, whereupon the smoothed DS1 signals are output to the DS1/DS2-mapping converter 24. In the DS1/DS2-mapping converter 24, the smoothed DS1 signals are converted into DS2 signals by mapping in synchronism with clocks generated by the DS3 clock generator 27. Namely, (DS2 signals)×1 ch are obtained by mapping (DS1 signals)×4 ch as depicted in FIG. 7(C).

At that time, if it has received a DS1-AIS inserting signal, the DS1-AIS inserting section 24a sets all the DS1 signals (DS1 data) in DS2 signals to "1" (inserts DS1-AIS).

Then, the DS2 signals obtained in the DS1/DS2-mapping converter 24 are converted into DS3 signals by mapping in the DS2/DS3-mapping converter 25. Namely, (DS3 signals)×1 ch are obtained by mapping (DS2 signals)×7 ch as schematically depicted in FIG. 7(D). The thus obtained DS3 signals are input to the selector 12 where the input DS3 signals are output to the U/B converter 28 as depicted in FIG. 4(A). The U/B converter 28 converts the DS3 signals (in-apparatus unipolar signals), which are input from the selector 12, into outside-apparatus bipolar signals and outputs the resulting signals to the DS3 network 1.

(3) Operation in Server Mode

The operation during the server mode, in which the already mapped DS3 signals in STS1 signals on SONET 2 are restructured as VT1.5-mapped STS1 signals and the resulting signals are transferred to SONET 2, will now be described.

In this case, because the selector 12 is controlled so as to assume "loop connection", as depicted in FIG. 4(B), in accordance with line setting by a network administrator (step S1, YES route of step S4, YES route of step S5, step S7 in FIG. 5), DS3-mapped STS1 signals, which have been received from SONET 2, are terminated by the STS1 demapping section 21 and are then demapped as DS3 signals by the DS3 demapping sub-section 21a. Namely, DS3 data are demapped from STS1 signals, which are contained in the received STS3 signals with (DS3 data)×3 ch mapped thereon, so that DS3 signals (frame) is obtained as shown in FIG. 6(A).

At that time, if a high-order-group alarm (STS1 alarm) has been detected by the STS1 alarm detector 21c, such a message is given to the SONET-condition notification section 19 and, at the same time, a DS1-AIS inserting signal is sent to the DS1-AIS inserting sub-section 16a of the DS1/VT1.5 mapping section 16. Namely, in this embodiment, if an alarm has been detected in high-order-group-signal (DS3 signal) level to be turned over within the apparatus, DS1-AIS signals are inserted as a batch into the DS1 signals, whose transmission speed is slowest among those of the signals to be treated within the apparatus and which are to be mapped on the high-order-group signals, thereby downsizing the circuit and suppressing any increase of power consumption.

Then, the DS3 signals obtained by the DS3 demapping sub-section 21a are input to the selector 12 where the input DS3 signals are turned over to the DS3-to-VT1.5-to-STS1 converter 40 (DS3/DS2-demapping converter 13) as depicted in FIG. 4(B). Subsequently, likewise in the case of the non-server mode, signal conversion from DS3 signals into VT1.5-mapped STS1 signals (FIGS. 6(B) through 6(E)) and necessary DS1-AIS insertion take place via the DS3/DS2-demapping converter 13, the DS2/DS1-demapping converter 14, the conversion memory 15, the DS1/VT1.5 mapping section 16 and the STS1 mapping section 17 (VT1.5 mapping sub-section 17a) successively in the described order. The resulting signals are then transferred to SONET 2.

However, during this signal conversion, the DS1/VT1.5 mapping section 16 sets all DS1 data in DS2 signals to "1" by the DS1-AIS inserting sub-section 16a not only if an alarm has occurred with DS3 signals, DS2 signals but also if an STS1 alarm has occurred when the received STS1 signals are demapped as DS3 signals by the STS1 demapping section 21 (a DS1-AIS inserting signal has been received by the DS1-AIS inserting sub-section 16a).

Namely, as depicted in, for example, FIG. 9, in any of the following cases: (a) if a signal alarm (STS1 alarm) has been detected with the STS1 signals (step S11) received from SONET 2 (YES route of step S12), (b) if a signal alarm (DS3 alarm) has been detected with the DS3 signals demapped from STS1 signals (from NO route of step S12 to step S13, YES route of step S14), (c) if a signal alarm (DS2 alarm) has been detected with the DS2 signals demapped from DS3 signals (from NO route of step S14 to step S15 and YES route of step S16), and (d) if a signal alarm (DS1 alarm) has been detected with DS1 signals demapped from DS2 signals (from NO route of step S16 to step 17 and YES route of step S18); a DS1-AIS inserting signals is sent to the DS1-AIS inserting sub-section 16a (step 19) and all DS1 data of VT1.5 signals are set to "1" in the DS1-AIS inserting sub-section 16a (step S20 in FIGS. 10(A) through 10(C) and hatching portions in FIG. 10(D)), whereupon VT1.5 signals are mapped on STS1 signals and the resulting STS1 signals are output to SONET 2 (step S22).

If an alarm in any level was not detected (NO route of any of steps S12, S14, S16, S18), (DS1 signals)×28 ch are mapped on (VT1.5 signals)×28 ch without inserting an alarm (step S21), whereupon VT1.5-mapped STS1 signals are output to SONET 2 (step S22).

Otherwise if VT1.5-mapped STS1 signals are received from SONET 2, signal conversion from VT1.5-mapped STS1 signals (FIGS. 7(A) through 7(D)) and necessary DS1-AIS insertion take place via the STS1 demapping section 21 (VT1.5 demapping sub-section 21b), the VT1.5/DS1 demapping section 22, the destuff memory 23, the DS1/DS2-mapping converter 24 and the DS2/DS3-mapping converter 25 successively in the described sequence likewise in the case of non-server mode.

In the selector 12, the thus obtained DS3 signals are turned over to STS1 mapping section 17 (DS3 mapping sub-section 17b) (FIG. 4(B)) where the DS3 signals are converted into STS1 signals by mapping in synchronism with clocks from the STS1 clock generator 18 (FIG. 7(E)) and the STS1 signals are transferred to SONET 2.

Figure 8:
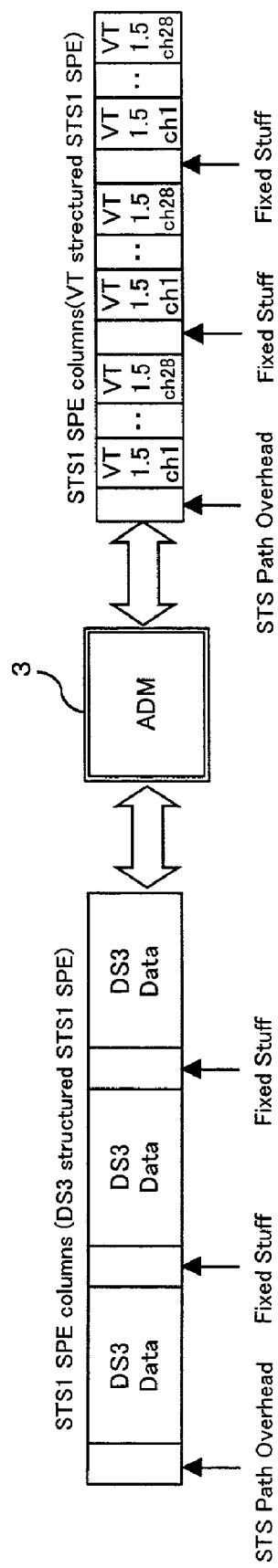
FIG. 8 illustrates the manner in which signals are converted in format by ADM of FIGS. 2 and 3.

Namely, the ADM node 3 (VT interface 31) of this embodiment enables signal conversion from DS3-mapped STS1 signals to VT1.5-mapped STS1 signals and vice versa in the server mode as schematically depicted in FIG. 8.

As mentioned above, according to the ADM node 3 (VT interface 31) of this embodiment, by selectively outputting the DS3 signals, which have been obtained by the STS1-to-DS3 converter 60 from STS1 signals received from SONET 2, or the DS3 signals, which have been received from the DS3 network 1, as input signals to the DS3-to-VT1.5-to-STS1 converter 40 (FIGS. 4(A) and 4(B)) by the selector 12, it is possible to provide transfer services in terms of DS3 signals in the ADM node 3 on SONET 2 supporting transfer in terms of VT1.5 signals and also to restructure DS3-mapped STS1 signals, which could hitherto be supported only in terms of STS1 signals, into VT1.5-mapped STS1 signals.

Therefore, exercising the DS3 network 1 and meeting with demands for apparatus which can perform mapping and demapping processes in terms of VT1.5 signals on SONET 2 and can be comfortably connected with SONET 2 supporting transfer of VT1.5 signals, it is possible to restructure also DS3-mapped STS1 signals on SONET 2 in terms of VT1.5 signals so that services, such as cross-connecting, can be supported in terms of VT1.5 signals by a unitary apparatus.

And because the DS3 signals obtained from STS1 signals, which are received from SONET 2, by the STS1-to-VT1.5-to-DS3 converter 70 or the DS3 signals, which are received from the DS3 network 1, are selectively outputted as input signals to the DS3-to-STS1 converter 50, it is possible to exercise services in terms of DS3 signals in the ADM node 3 on SONET 2 supporting transfer of VT1.5 signals and to restructure VT1.5-mapped STS1 signals into DS3-mapped STS1 signals.

Further, in this embodiment, because detection messages regarding alarms in individual levels are collected in the SONET-condition notification section 19, which is the only notification section within the apparatus, and are notified batchwise to a network administrator, it is possible to reduce duty load of the network administrator remarkably.

(4) Protection Operation at Occurrence of Alarm

The protection operation when an alarm occurs on SONET 2 having the above-mentioned ADM node 3 will now be described.

Figure 11:
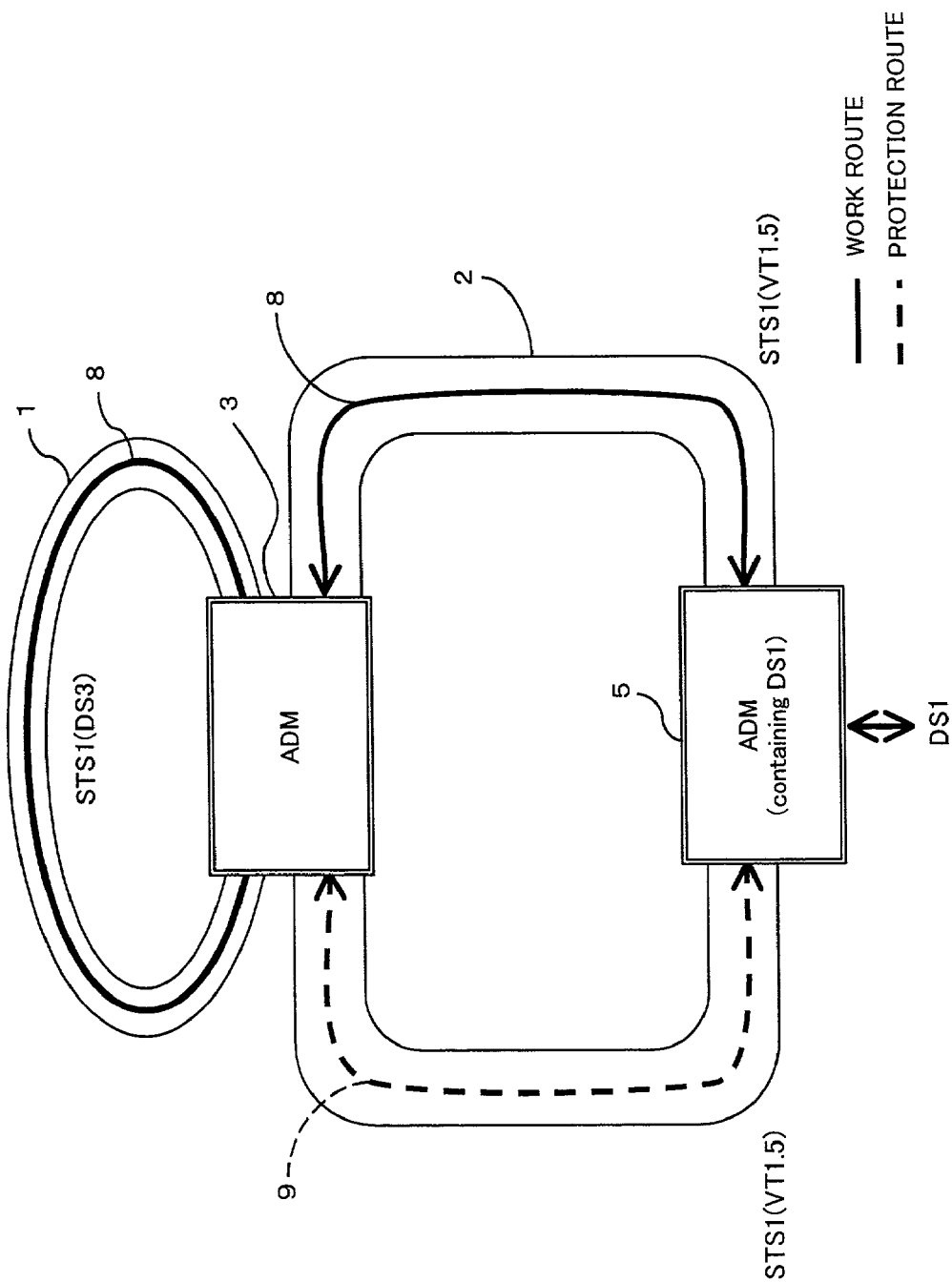
FIG. 11 is a block diagram showing a network in which ADM node of FIGS. 2 and 3 are used as gate node (non-server mode)

(4-1) In Non-Server Mode the ADM Node 3 is Operated as a Gate Node:

FIG. 11 shows a signal route when the above-mentioned ADM node 3 is connected to the existing ADM node (e.g., the ADM node 5 of FIG. 1). As shown in FIG. 11, DS1 signals (1.544 Mbps) added in the ADM node 5 are transferred as VT1.5-mapped STS1 signal to the ADM node 3 in SONET 2 along a route (work route) indicated by a thick solid line 8.

In this case, because it suffices for the ADM node 3 operates in the non-server mode, the selector 12 is controlled so as to assume "line connection" in accordance with line setting by a network administrator (from NO route of step S5 to steps S8 and S9 in FIG. 5); VT1.5-mapped STS1 signals received from the work route 8 are converted into DS3 signals, and the resulting signals are dropped onto DS3 network 1. Inversely, DS3 signals from the DS3 network 1 are converted into VT1.5-mapped STS1 signals in the ADM node 3 and the resulting signals are added onto SONET 2 and dropped as DS1 signals in the ADM node 5.

Figure 12:
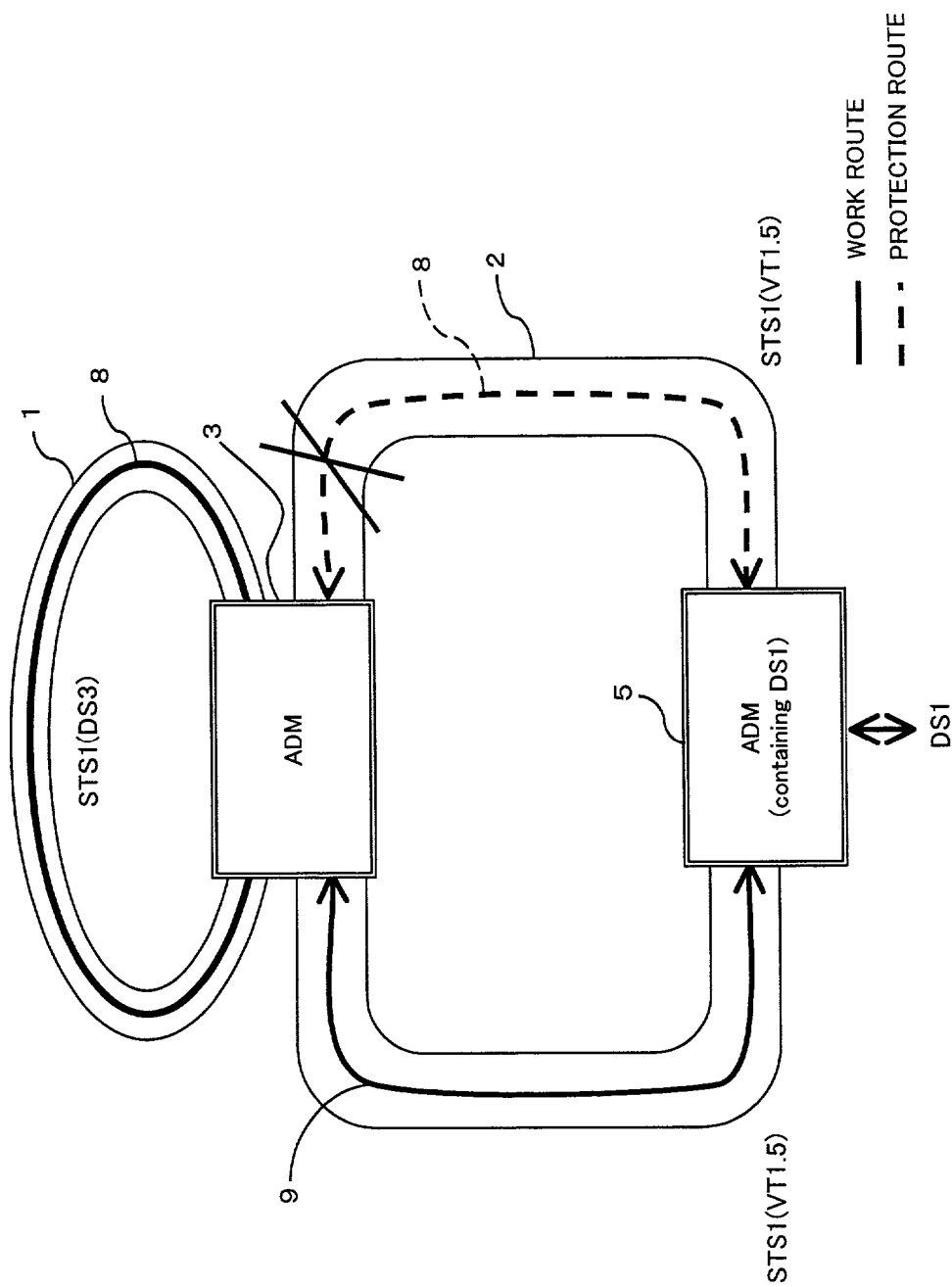
FIG. 12 is a block diagram illustrating the manner in which a protection operation takes place upon occurrence of a fault in the network of FIG. 11.

In this way of operation, it is assumed that an alarm has occurred in the work route 8 of SONET 2 as shown in FIG. 12. Though the DS1 signals added in the ADM node 5 are transferred on SONET 2 as VT1.5-mapped STS1 signals, the work route 8 (dotted line) is blocked due to the occurrence of the alarm; the ADM node 5 therefore changes cross-connect setting to a protection route 9 (solid line) so that VT1.5-mapped STS1 signals can reach the ADM node 3 along the protection route 9.

Also in this case, because it suffices for the ADM node 3 operates in the non-server mode, the selector 12 of the ADM node 3 is controlled so as to assume "line connection"; as mentioned above, VT1.5-mapped STS1 signals are converted into DS3 signals and the resulting signals are dropped onto the DS3 network 1. Inversely to the above-mentioned way of operation, the DS3 signals added in ADM node 3 are dropped as the DS1 signals in the ADM node 5.

Figure 13:
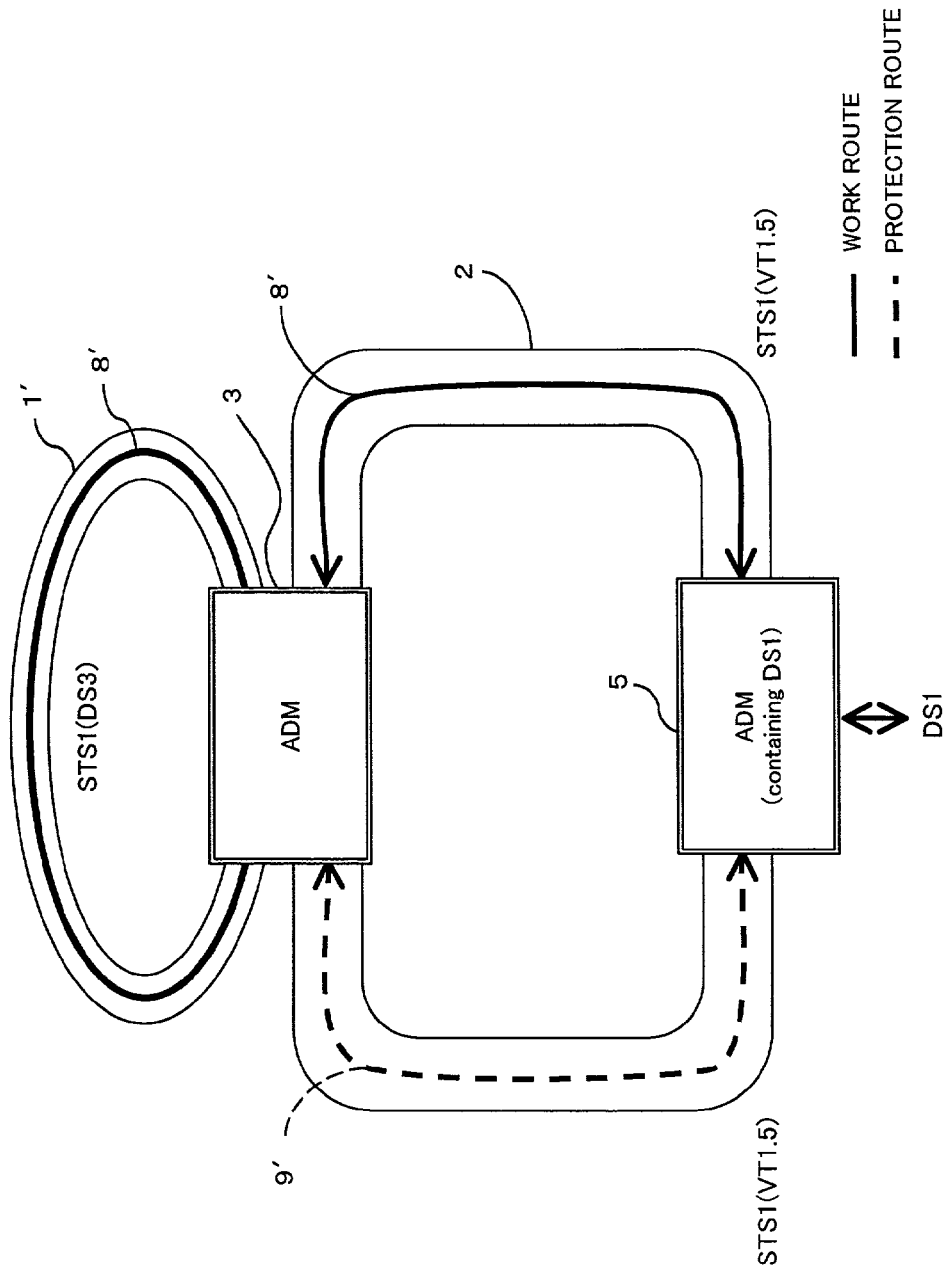
FIG. 13 is a block diagram showing a network in which ADM node of FIGS. 2 and 3 are used as gate node (server mode)

(4-2) In Server Mode the ADM Node is Operated as a Gate Node:

FIG. 13 shows a signal route the above-mentioned ADM node 3 is connected as a gate node with the existing ADM node (e.g., the ADM node 5 of FIG. 1). As shown in FIG. 13, the DS1 signals (1.544 Mbps) added in the ADM node 5 are transferred, as VT1.5-mapped STS1 signals, to the ADM node 3 along a route (work route), which is indicated by a solid line 8' in SONET 2.

In this case, because the ADM node 3 has to be operated in the server mode, the selector 12 is controlled so as to assume "loop connection" in accordance with line setting by a network administrator (from YES route of step S5 to steps S6 and S7 in FIG. 5). In the ADM node 3, the received VT1.5-mapped STS1 signals are thereby converted into DS3-mapped STS1 signals as described above, and the resulting signals are dropped onto SONET 1' (corresponding to another SONET different from SONET 2).

Inversely, DS3-mapped STS1 signals from SONET 1' are converted into VT1.5-mapped STS1 signals to add onto SONET 2 in ADM node 3, and are dropped as DS1 signals in the ADM node 5.

Figure 14:
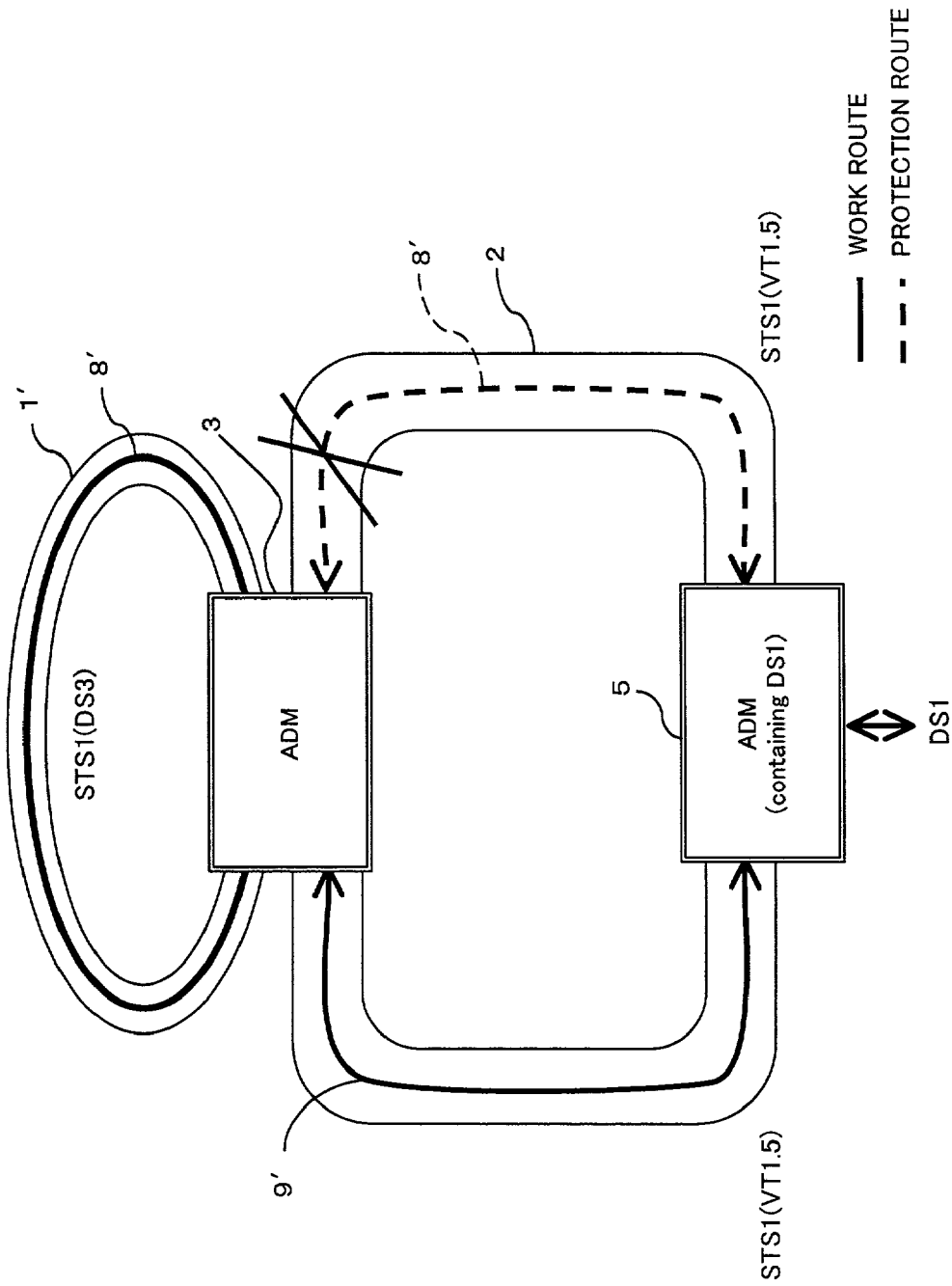
FIG. 14 is a block diagram illustrating the manner in which a protection operation takes place upon occurrence of a fault in the network of FIG. 13.

In this way of operation, it is now assumed that an alarm has occurred in a work route 8' of SONET 2 as shown in FIG. 14. The DS1 signals added in the ADM node 5 are transferred to SONET 2 as VT1.5-mapped STS1 signals; because the work route 8' is blocked due to occurrence of the alarm, the ADM node 5 changes (cross-connect setting) the work route 8', in which the alarm has been detected, to a protection route 9'. The VT1.5-mapped STS1 signals thereby reach the ADM node 3 along the protection route 9'.

In this case, because it suffices for the ADM node 3 to be operated in the server mode, the selector 12 of the ADM node 3 is controlled so as to assume "loop connection" so that, as mentioned above, VT1.5-mapped STS1 signals are converted into DS3-mapped STS1 signals to drop onto SONET 1'. Inversely to the above-mentioned way of operation, the DS3-mapped STS1 signals added in the ADM node 3 are dropped in the ADM node 5 as DS1 signals.

Figure 15:
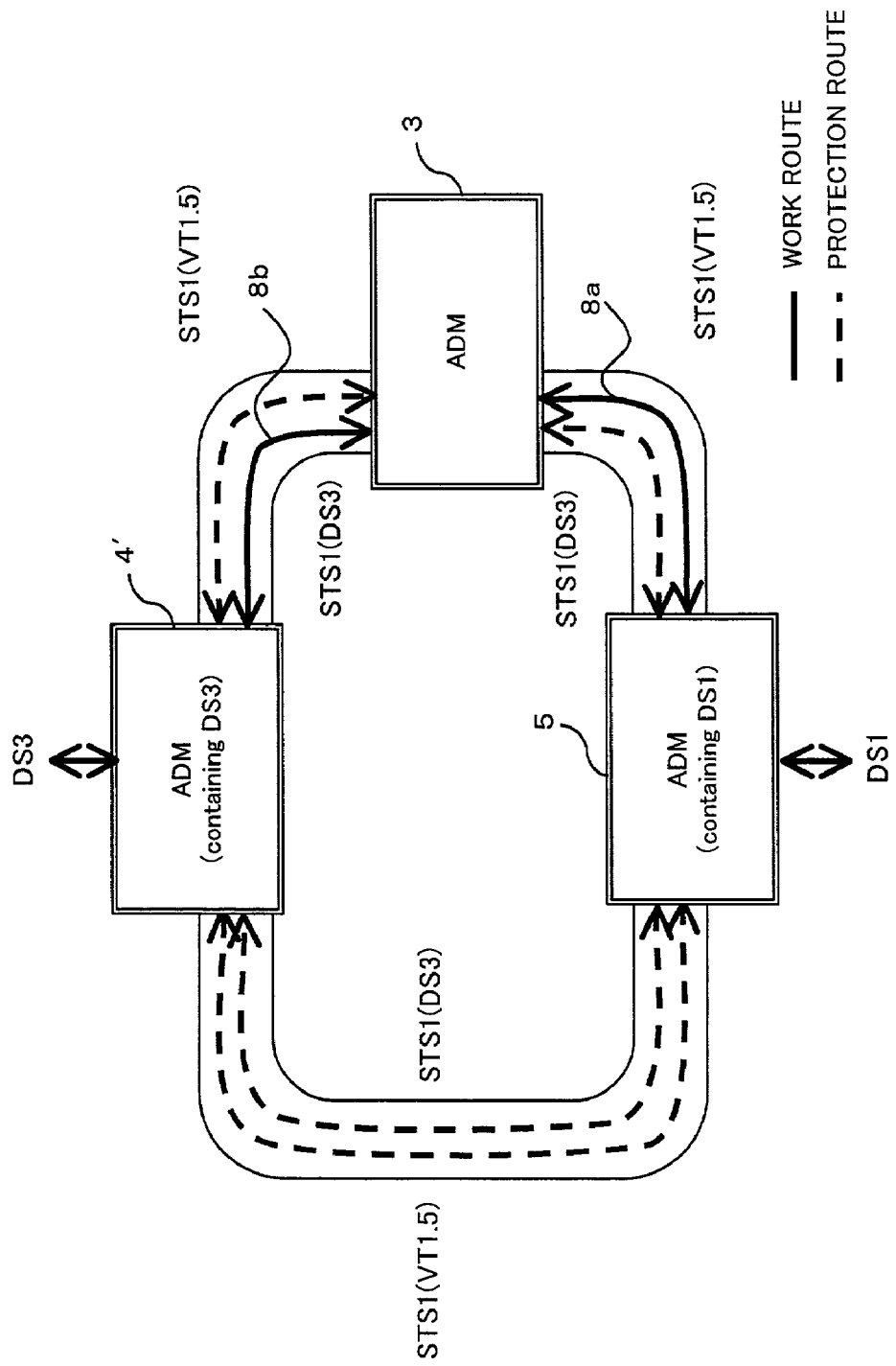
FIG. 15 is a block diagram showing a network in which ADM node of FIGS. 2 and 3 are used as relay node (server mode)

(4-3) In Server Mode the ADM Node 3 is Operated as a Relay Node:

FIG. 15 shows a signal route the above-mentioned ADM node 3 is operated as a relay node on SONET 2 (a node not accommodating another network). In FIG. 15, 4' designates an existing ADM node connecting between SONET 2 and the DS3 network; 5, another existing ADM node connecting between SONET 2 and the DS1 network.

In an ordinary way of operation, the DS1 signals added in the ADM node 5 reach the ADM node 3 of this embodiment along a route (work route), which is indicated by a thick solid line 8b, in SONET 2 as VT1.5-mapped STS1 signals.

In this case, because the ADM node 3 has to be operated in the server mode, the selector 12 is controlled so as to assume "loop connection" in accordance with line setting by a network administrator (from YES route of step S5 to steps S6 and S7 in FIG. 5). As described above, the ADM node 3 thereby converts the received VT1.5-mapped STS signals into DS3-mapped STS1 signals and transfers the resulting signals to SONET 2. The DS3-mapped STS1 signals then reach an ADM node 4' along a route (work route), which is indicated by a thick solid line 8b, in SONET 2.

In the ADM node 4', the DS3 signals are demapped from the DS3-mapped STS1 signals to drop onto the DS3 network. Otherwise in the case where DS3 signals are added in the ADM node 4' and DS1 signals are dropped in the ADM node 5 via the ADM node 3, the foregoing operation is inversed.

Figure 16:
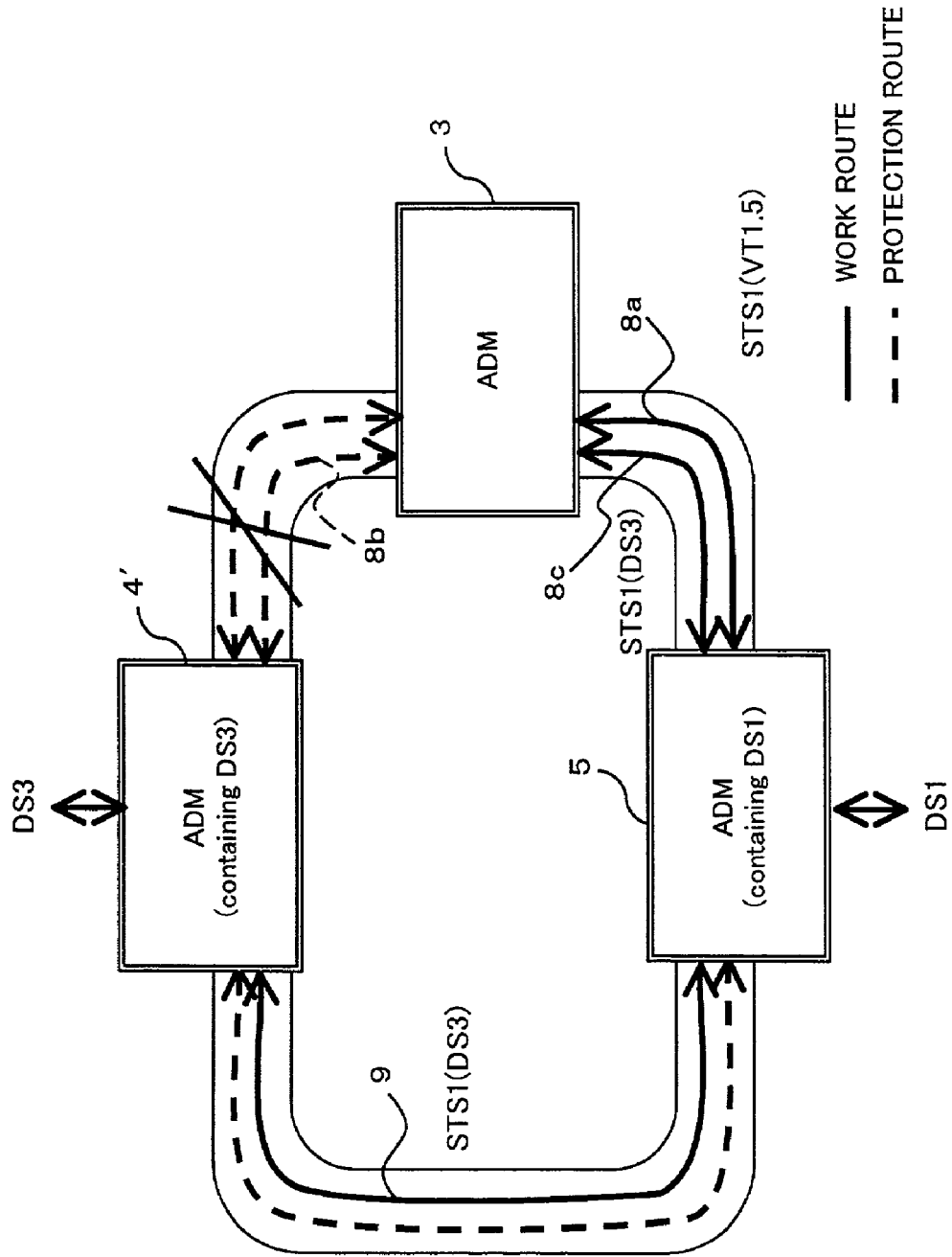
FIG. 16 is a block diagram illustrating the manner in which a protection operation takes place upon occurrence of a fault in the network of FIG. 15.
Figure 17:
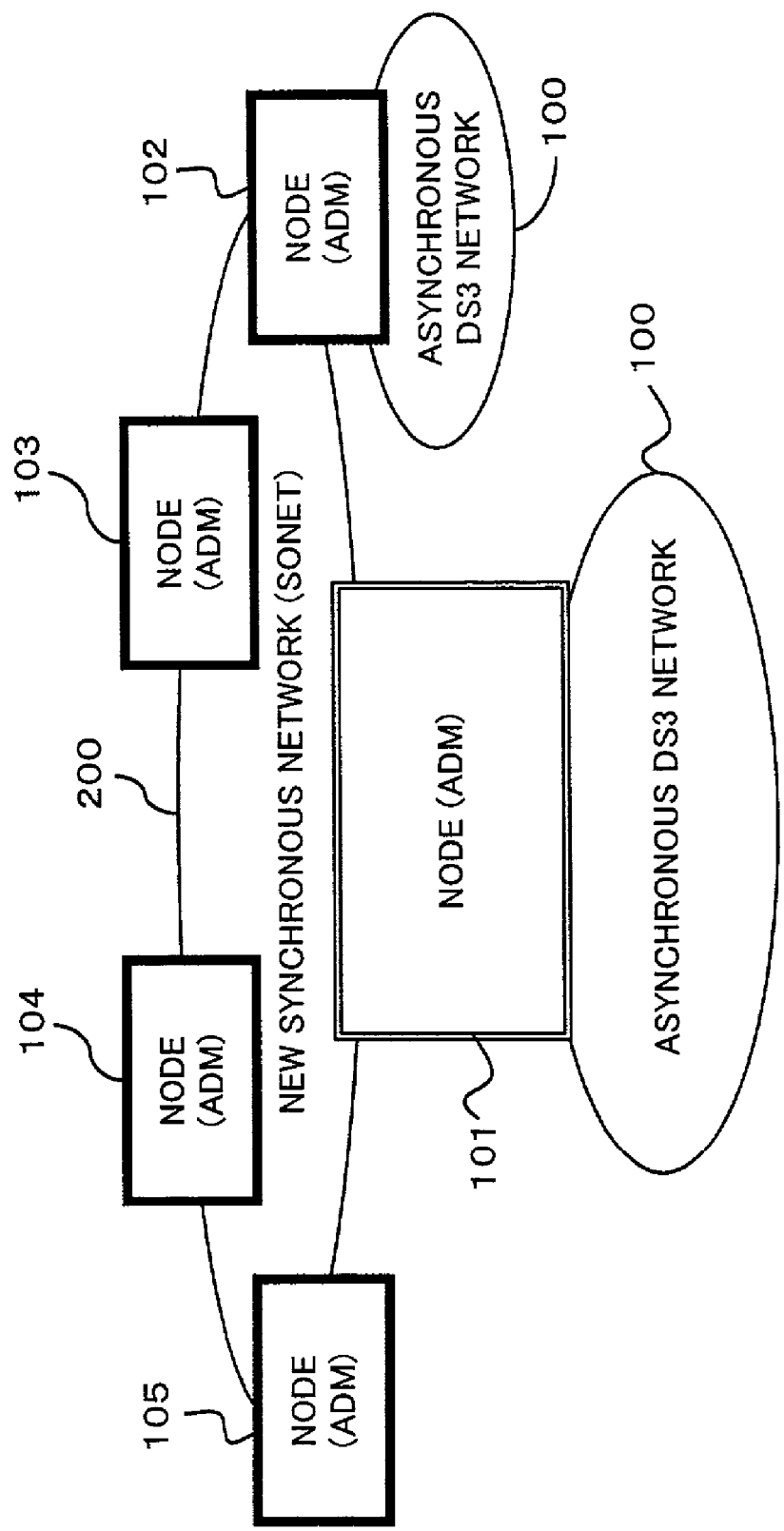
FIG. 17 is a block diagram showing an exemplary existing SONET.
Figure 18:
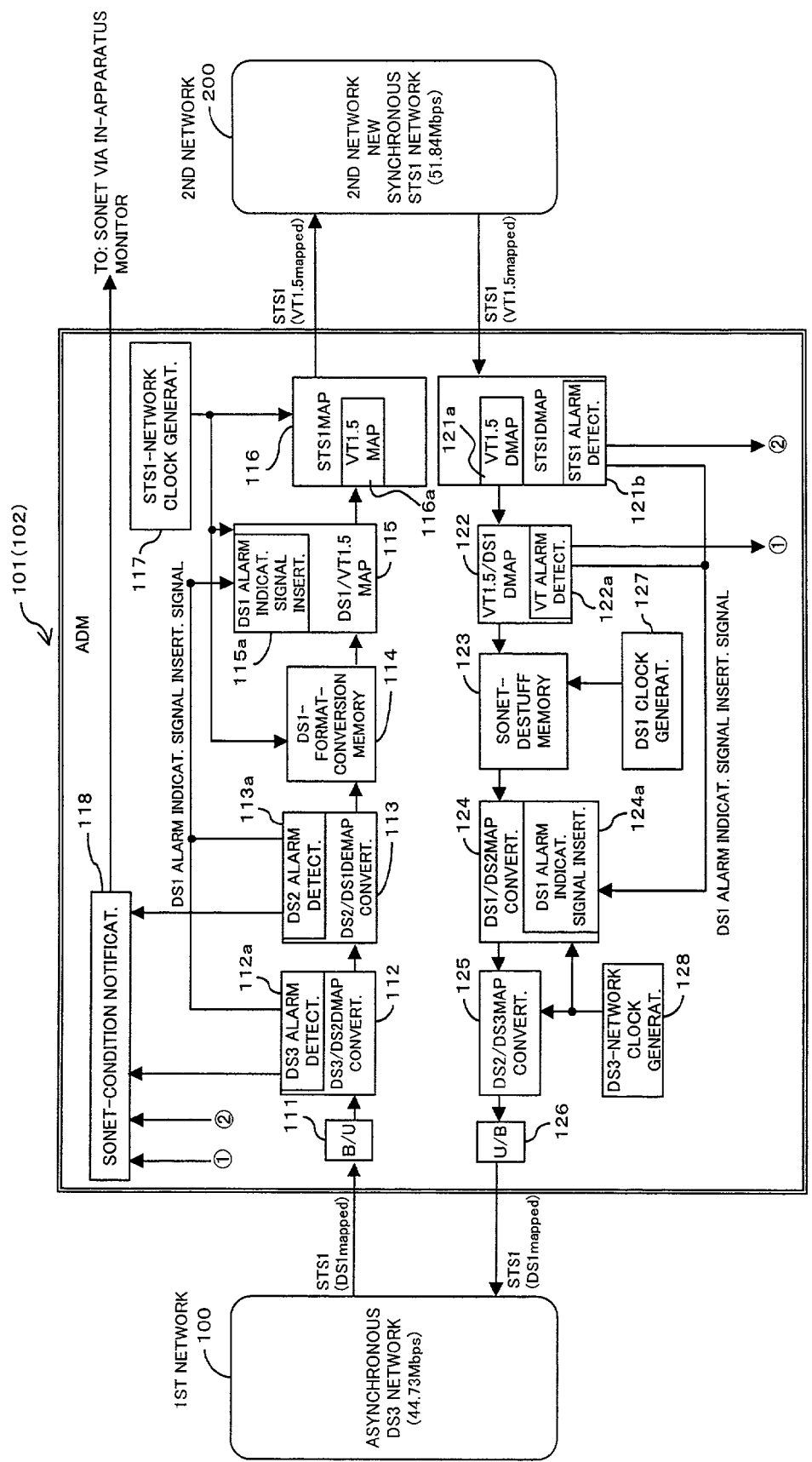
FIG. 18 is a block diagram showing an interface of the ADM node constituting SONET of FIG. 15.
Figures 19A, 19B:
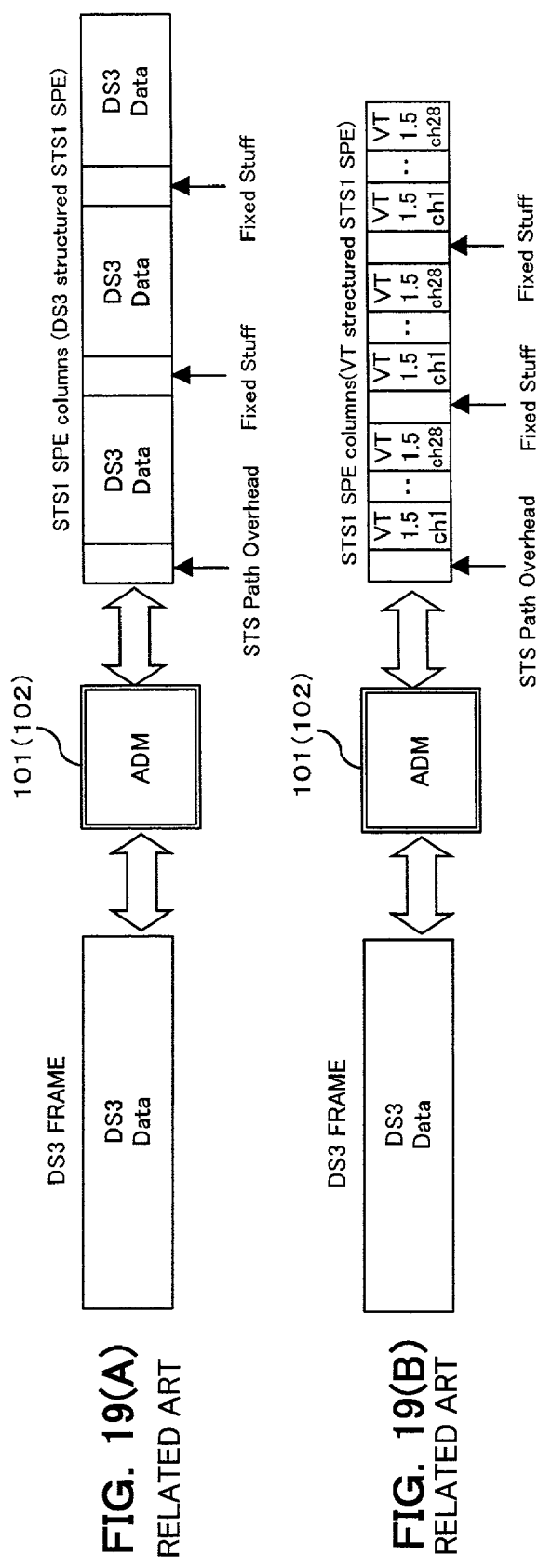
FIGS. 19(A) and 19(B) each illustrate the manner in which signals are converted in format by the existing ADM node.

In this way of operation, as shown in FIG. 16, it is assumed that an alarm has occurred in a transfer route (work route 8b) between the ADM node 3 and the ADM node 4'. In this case, the ADS1 signals added in the ADM node 5 are transferred in SONET 2 along a work route 8a, thus reaching the ADM node 3.

The ADM node 3, as mentioned above, converts VT1.5-mapped STS1 signals into DS3-mapped STS1 signals and attempts to transfer the resulting signals toward the ADM node 4'. However, because the work route 8b is blocked due to the alarm, the ADM node 3 changes cross-connect setting of the cross-connect 32 to switch the transfer route from the work route 8b to a protection route 8c. DS3-mapped STS1 signals are thereby returned to the ADM node 5 along the protection route 8c.

The ADM node 5 transfers DS3-mapped STS1 signals along a route (protection route) indicated by a thick solid line 9. The DS3-mapped STS1 signals thereby reach the ADM node 4' along the protection route 9 where the received DS3-mapped STS1 signals are dropped as DS3 signals onto the DS3 network.

(5) Alternative Embodiment

In the foregoing illustrated embodiment, the first low-order-group signals, the second low-order-group signals and the high-order-group signals are DS3 signals, VT1.5 signals and STS1 signals, respectively. The present invention should by no means be limited to this illustrated example, and alternative groups of signals may be adopted if they satisfy the relation second-low-order-group signals<first-low-order-group signals<high-order-group signals in transmission speed, achieving the same results as the foregoing embodiment.

Other changes or modifications may be suggested without departing from the scope and gist of the invention.

What is claimed is:

1. An add/drop multiplexer for connection between a first network, on which first low-order group signals are transferred at a predetermined speed, and a second network, on which high-order group signals are transferred at a higher speed than that of the first low-order group signals, said multiplexer comprising:

(a) a cross-connect for handling cross-connecting of signals to be transferred between the first and second networks in terms of second low-order group signals whose transmission speed is slower than that of either the high-order group signals or the first low-order group signals; and (b) an interface for handling signal transfer to and from said cross-connect in terms of the high-order group signals; said interface including (b1) a first signal converter for converting inputted first low-order group signals into high-order group signals, which are to be transferred to the second network and to which second low-order group signals slower in transmission speed than that of the first low-order group signals are multiplexed, and outputting the resulting high-order group signals to said cross-connect, (b2) a second signal converter for converting high-order group signals, which are received from the second network via said cross-connect, into first low-order group signals, and (b3) a selector for selectively outputting the first low-order group signals, which are received from the first network, or the first low-order group signals, which are obtained by said second signal converter, as last-named input signals to said first signal converter.

2. An add/drop multiplexer for connection between a first network, on which first low-order group signals are transferred at a predetermined speed, and a second network, on which high-order group signals are transferred at a higher speed than that of the first low-order group signals, said multiplexer comprising:

(a) a cross-connect for handling cross-connecting of signals to be transferred between the first and second networks in terms of second low-order group signals whose transmission speed is slower than that of either the high-order group signals or the first low-order group signals; and (b) an interface for handling signal transfer to and from said cross-connect in terms of the high-order group signals; said interface including (b1) a third signal converter for converting inputted first low-order group signals into the high-order group signals to be transferred to the second network, and outputting the obtained high-order group signals to said cross-connect, (b2) a fourth signal converter for converting the high-order group signals, which are received from the second network, into first low-order group signals, which are to be transferred to the first network and to which second low-order group signals slower in transmission speed than that of the first low-order group signals are multiplexed, and (b3) a selector for selectively outputting the first low-order group signals, which are received from the first network, or the first low-order group signals, which are obtained by said fourth signal converter, as last-named input signals to said third signal converter.

3. An add/drop multiplexer for connection between a first network, on which first low-order group signals are transferred at a predetermined speed, and a second network, on which high-order group signals are transferred at a higher speed than that of the first low-order group signals, said multiplexer comprising:
(a) a cross-connect for handling cross-connecting of signals to be transferred between the first and second networks in terms of second low-order group signals whose transmission speed is slower than that of either the high-order group signals or the first low-order group signals; and
(b) an interface for handling signal transfer to and from said cross-connect in terms of the high-order group signals; said interface including
  (b1) a first signal converter for converting inputted first low-order group signals into high-order group signals, which are to be transferred to the second network and to which second low-order group signals slower in transmission speed than that of the first low-order group signals are multiplexed, and outputting the resulting high-order group signals to said cross-connect,
  (b2) a second signal converter for converting high-order group signals, which are received from the second network via said cross-connect, into first low-order group signals,
  (b3) a third signal converter for converting inputted first low-order group signals into high-order group signals to be transferred to the second network, and outputting the resulting high-order group signals to said cross-connect,
  (b4) a fourth signal converter for converting high-order group signals, which are received from the second network via said cross-connect, into first low-order group signals, which are to be transferred to the first network and to which second low-order group signals are multiplexed, and
  (b5) a selector for selectively outputting first low-order group signals, which are received from the first network, or first low-order group signals, which are obtained by said second signal converter, as first-named input signals to said first signal converter,
said selector being operable also to selectively output the first low-order group signals, which are received from the first network, or the first low-order group signals, which are obtained by said fourth signal converter, as second-named input signals to said third signal converter.

4. An add/drop multiplexer according to claim 3, wherein:
said second signal converter includes an alarm detector for detecting an alarm with respect to the high-order group signals during the conversion of the high-order group signals from the second network into the first low-order group signals; and
said first signal converter includes an alarm-indication setting section, responsive to the detection of an alarm with respect to the high-order group signals by said alarm detector, for setting second low-order group signals, which are to be multiplexed to the high-order group signals while first low-order group signals to be selected and outputted by said selector are converted into the high-order group signals, as those assuming an alarm indication status.

5. An interface for connection between a first network, on which first low-order group signals are transferred at a predetermined speed, and a second network, on which high-order group signals are transferred at a higher speed than that of the first low-order group signals, said interface comprising:
(a) a first signal converter for converting inputted first low-order group signals into high-order group signals, which are to be transferred to the second network and to which second low-order group signals slower in transmission speed than that of the first low-order group signals are multiplexed;
(b) a second signal converter for converting high-order group signals, which are received from the second network, into first low-order group signals; and
(c) a selector for selectively outputting first low-order group signals, which are received from the first network, or first low-order group signals, which are obtained by said second signal converter, as last-named input signals to said first signal converter, wherein
said interface is comprised in an add/drop multiplexer and handles signal transfer to and from a cross-connect of the add/drop multiplexer in terms of the high-order group signals.

6. An interface for connection between a first network, on which first low-order group signals are transferred at a predetermined speed, and a second network, on which high-order group signals are transferred at a higher speed than that of the first low-order group signals, said interface comprising:
(a) a third signal converter for converting inputted first low-order group signals into the high-order group signals to be transferred to the second network;
(b) a fourth signal converter for converting high-order group signals, which are received from the second network, into first low-order group signals, which are to be transferred to the first network and to which second low-order group signals slower in transmission speed than that of the first low-order group signals are multiplexed; and
(c) a selector for selectively outputting first low-order group signals, which are received from the first network, or first low-order group signals, which are obtained by said fourth signal converter, as last-named input signals to said third signal converter, wherein
said interface is comprised in an add/drop multiplexer and handles signal transfer to and from a cross-connect of the add/drop multiplexer in terms of the high-order group signals.

7. An interface for connection between a first network, on which first low-order group signals are transferred at a predetermined speed, and a second network, on which high-order group signals are transferred at a higher speed than that of the first low-order group signals, said interface comprising:
(a) a first signal converter for converting inputted first low-order group signals into high-order group signals, which are to be transferred to the second network and to which second low-order group signals slower in transmission speed than that of the first low-order group signals are multiplexed;
(b) a second signal converter for converting high-order group signals, which are received from the second network, into first low-order group signals;
(c) a third signal converter for converting inputted first low-order group signals into high-order group signals to be transferred to the second network;
(d) a fourth signal converter for converting high-order group signals, which are received from the second network, into first low-order group signals, which are to be transferred to the first network and to which second low-order group signals are multiplexed; and (e) a selector for selectively outputting first low-order group signals, which are received from the first network, or first low-order group signals, which are obtained by said second signal converter, as first-named input signals to said first signal converter;

said selector being operable also to selectively output first low-order group signals, which are received from the first network, or first low-order group signals, which are obtained by said fourth signal converter, as second-named input signals to said third signal converter, wherein said interface is comprised in an add/drop multiplexer and handles signal transfer to and from a cross-connect of the add/drop multiplexer in terms of the high-order group signals.

8. An interface according to claim 7, wherein:

said second signal converter includes an alarm detector for detecting an alarm with respect to the high-order group signals during the conversion of the high-order group signals from the second network into the first low-order group signals; and said first signal converter includes an alarm-indication setting section, responsive to the detection of an alarm with respect to the high-order group signals by said alarm detector, for setting the second low-order group signals, which are to be added to the high-order group signals while the first low-order group signals selected and outputted by said selector are converted into the high-order group signals, as those assuming an alarm indication status.

* * * * *